(12) United States Patent
Kim

(10) Patent No.: US 9,858,014 B2
(45) Date of Patent: *Jan. 2, 2018

(54) MEMORY SYSTEM AND METHOD OF OPERATING SAME USING PROGRAM ORDER INFORMATION

(71) Applicant: SAMSUNG ELECTRONICS CO., LTD., Suwon-si, Gyeonggi-Do (KR)

(72) Inventor: Kyung-Ryun Kim, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 270 days.

This patent is subject to a terminal disclaimer.

(21) Appl. No.: 14/666,476

(22) Filed: Mar. 24, 2015

(65) Prior Publication Data

US 2016/0124647 A1   May 5, 2016

(30) Foreign Application Priority Data

Oct. 29, 2014 (KR) .......... 10-2014-0148441

(51) Int. Cl.
G06F 3/06 (2006.01)

(52) U.S. Cl.
CPC .......... *G06F 3/0679* (2013.01); *G06F 3/061* (2013.01); *G06F 3/0659* (2013.01)

(58) Field of Classification Search
CPC ...... G06F 3/061; G06F 3/0653; G06F 3/0673; G06F 3/0604; G06F 3/0629; G06F 3/0679; G06F 3/023; G06F 3/038; G06F 3/0481; G06F 9/4443

See application file for complete search history.

(56) References Cited

U.S. PATENT DOCUMENTS

| | | | |
|---|---|---|---|
| 6,678,785 B2 | 1/2004 | Lasser |
| 7,012,835 B2 | 3/2006 | Gonzalez et al. |
| 7,649,776 B2 | 1/2010 | Abiko et al. |
| 7,908,423 B2 | 3/2011 | Hsu et al. |
| 8,072,805 B2 | 12/2011 | Chou et al. |
| 8,205,033 B2 | 6/2012 | Saeki et al. |
| 8,248,856 B2 | 8/2012 | Goss et al. |
| 8,255,614 B2 | 8/2012 | Omizo et al. |
| 8,264,882 B2 | 9/2012 | Moschiano et al. |
| 8,456,911 B2 | 6/2013 | Yuan et al. |
| 8,665,645 B2 | 3/2014 | Avraham et al. |
| 8,737,136 B2 | 5/2014 | Cometti |

(Continued)

FOREIGN PATENT DOCUMENTS

| | | |
|---|---|---|
| JP | 2006133923 | 5/2006 |
| JP | 2008097705 | 4/2008 |

(Continued)

OTHER PUBLICATIONS

Desnoyers, Peter, "Analytic Modling of SSD Write Performance".

*Primary Examiner* — Zhuo Li
(74) *Attorney, Agent, or Firm* — Volentine & Whitt, PLLC

(57) ABSTRACT

A method of operating a memory system includes managing program order information of the memory device based on program order stamps (POSs) indicating relative temporal relationships between program operations performed in relation to a plurality of memory groups included in the memory device, and controlling operations directed to the plurality of memory groups in response to the program order information.

19 Claims, 22 Drawing Sheets

(56) References Cited

U.S. PATENT DOCUMENTS

| | | |
|---|---|---|
| 8,743,604 B2 | 6/2014 | Chae |
| 2009/0265403 A1 | 10/2009 | Fukumoto |
| 2012/0268994 A1 | 10/2012 | Nagashima |
| 2012/0294104 A1* | 11/2012 | Mun ............... G11C 11/56 365/218 |
| 2013/0073788 A1 | 3/2013 | Post et al. |
| 2013/0159610 A1 | 6/2013 | Kawamura |
| 2014/0143630 A1 | 5/2014 | Mu et al. |
| 2014/0173172 A1 | 6/2014 | Yang et al. |
| 2014/0229131 A1 | 8/2014 | Cohen et al. |
| 2014/0229774 A1 | 8/2014 | Melik-Martirosian |
| 2014/0281119 A1 | 9/2014 | Hyun et al. |
| 2014/0359202 A1 | 12/2014 | Sun et al. |
| 2015/0179284 A1* | 6/2015 | Alrod ............... G06F 11/076 714/704 |

FOREIGN PATENT DOCUMENTS

| | | |
|---|---|---|
| JP | 2008276832 | 11/2008 |
| JP | 2011070735 | 4/2011 |
| JP | 2011095853 | 5/2011 |
| JP | 2012123498 | 6/2012 |
| KR | 2010017906 A | 11/2010 |
| KR | 20100022229 A | 11/2010 |
| KR | 20140021909 A | 2/2014 |

\* cited by examiner

POS

| F_AR | POS_AR |
|------|--------|

FIG. 12

TABLE1

121

| ADDR | POS |
|---|---|
| 0 | 0 |
| 1 | 0 |
| 2 | 1 |
| ... | ... |
| N-1 | 0 |
| N | 0 |

⇒

122

| ADDR | POS |
|---|---|
| 0 | 29434 |
| 1 | 24679 |
| ... | ... |
| K | 30000 |
| ... | ... |
| N | 22435 |

FIG. 13

TABLE2

| POS | ADDR |
|---|---|
| 1 | 2843 |
| 2 | 173 |
| ... | ... |
| M | 27 |

| INDEX | ADDR |
|-------|------|
| 0 | 10 |
| 1 | 1457 |
| 2 | 1 |
| 3 | 73 |
| 4 | 325 |
| 5 | 10 |
| ... | ... |
| M | 27 |

SI →

MEMORY SYSTEM AND METHOD OF OPERATING SAME USING PROGRAM ORDER INFORMATION

CROSS-REFERENCE TO RELATED APPLICATION

This application claims the benefit of Korean Patent Application No. 10-2014-0148441 filed on Oct. 29, 2014, the subject matter of which is hereby incorporated by reference.

BACKGROUND

The inventive concept relates generally to memory systems, memory devices and methods of operating a memory system. More particularly, the inventive concept relates to methods of operating a memory system and/or memory device using program order information.

SUMMARY

According to an aspect of the inventive concept, there is provided a method of operating a memory system including a memory device, the method including managing program order information of the memory device based on program order stamps (POSs) indicating relative temporal relationships between program operations performed in relation to a plurality of memory groups included in the memory device, and controlling operations directed to the plurality of memory groups in response to the program order information.

According to another aspect of the inventive concept, there is provided a method of operating a memory system including a memory device, the method including based on program order stamps (POSs) indicating relative temporal relationship between program operations performed on a plurality of memory groups that are included in the memory device, generating program order information that sequentially contains the POSs according to addresses of the plurality of memory groups, and controlling operations performed on the plurality of memory groups based on the program order information.

According to another aspect of the inventive concept, there is provided a method of operating a memory system including a memory device, the method including based on program order stamps (POSs) indicating relative temporal relationships between program operations performed on a plurality of memory groups that are included in the memory device, generating program order information that contains addresses of memory groups corresponding to POSs that are sequentially increased according to the POSs that are sequentially increased, and controlling operations performed on the plurality of memory groups based on the program order information.

According to another aspect of the inventive concept, there is provided a memory system including a memory device that includes a plurality of memory groups, and a memory controller that controls the memory device, wherein the memory controller includes a program order manager that manages program order information of the memory device based on program order stamps (POSs) indicating relative temporal relationships between program operations performed on the plurality of memory groups, and an operation controller that controls operations performed on the plurality of memory groups based on the program order information.

BRIEF DESCRIPTION OF THE DRAWINGS

Exemplary embodiments of the inventive concept will be more clearly understood from the following detailed description taken in conjunction with the accompanying drawings in which reference numerals denote structure elements and:

FIG. 12 is an illustration of a first table listing an example of program order information;

FIG. 13 is an illustration of a second table listing another example of program order information;

DETAILED DESCRIPTION

Certain embodiments of the inventive concept will now be described in some additional detail with reference to the accompanying drawings. The inventive concept may, however, be embodied in many different forms and should not be construed as being limited to only the illustrated embodiments. Rather, these embodiments are provided so that this disclosure will be thorough and complete, and will fully convey the scope of the inventive concept to one of ordinary skill in the art. Throughout the written description and drawings, like reference numbers and labels are used to denote like or similar elements.

An expression used in the singular encompasses the expression of the plural, unless it has a clearly different meaning in the given context. Terms such as "including", "having," and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of exemplary embodiments.

Unless otherwise defined, all terms (including technical and scientific terms) used herein have the same meaning as commonly understood by one of ordinary skill in the art to which exemplary embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "and/or" includes any and all combinations of one or more of the associated listed items. Expressions such as "at least one of" when preceding a list of elements, modify the entire list of elements and do not modify the individual elements of the list.

Figure 1:
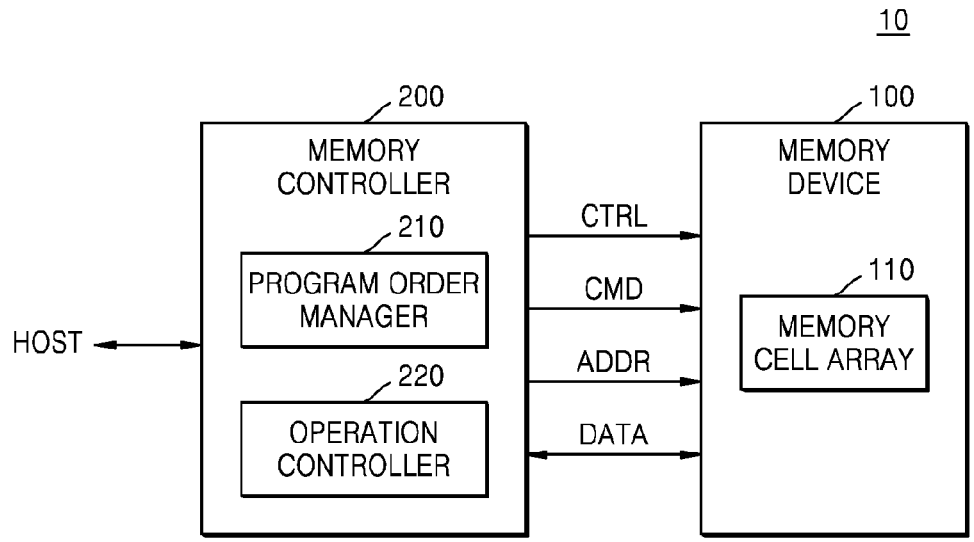
FIG. 1 is a detailed block diagram illustrating a memory system according to an embodiment of the inventive concept.

FIG. 1 is a block diagram illustrating a memory system 10 according to an embodiment of the inventive concept.

Referring to FIG. 1, the memory system 10 generally comprises a memory device 100 and a memory controller 200. The memory device 100 includes a memory cell array 110, and the memory controller 200 includes a program order manager 210 and an operation controller 220.

The memory cell array 110 configures a plurality of memory cells in relation to a plurality of word lines WL and an intersecting plurality of bit lines BL. The memory cells thus arranged in the memory cell array 110 may be flash memory cells, such as NAND flash memory cells and/or NOR flash memory cells. In the following description, it is assumed that the memory cells of the memory cell array 110 are NAND flash memory cells, but those skilled in the art will recognize that other types of nonvolatile memory cells might be additionally or alternately provided. For example, resistive memory cells such as resistive random-access memory (RRAM) cells, phase-change RAM (PRAM) cells, an/or magnetic RAM (MRAM) cells might be provided arranged in a constituent memory cell array of an embodiment of the inventive concept.

Further, the memory cell array 110 may be configured as a two-dimensional (or horizontal) NAND flash memory cell array, or a three-dimensional (or vertical) NAND flash memory cell array, as will be described in some additional detail hereafter.

The NAND flash memory cells of the memory cell array 110 may be a single-level memory cells (SLC) capable of storing 1-bit of data per memory and/or multi-level memory cells (MLC) configured to store 2 or more bits of data per memory cell.

In the embodiment illustrated in FIG. 1, the NAND flash memory cells of the memory cell array 110 are divided into respective "memory groups". The division or definition of memory groups may be accomplished in many different ways. For example, each memory group may include a certain number of memory blocks. Memory groups may be divided according to word lines, pages, or semiconductor dies. Further, each memory group may be sub-divided according to arbitrary "program units".

In the illustrated embodiment of FIG. 1, the memory controller 200 is configured to control the overall operation of the memory device 100, including the execution of read, write and erase operations, in response to corresponding request(s) issued by a host (HOST). In addition, the memory controller 200 may be configured to control the memory device 100 in the execution of sudden power-off, read reclaim, and/or wear leveling operations in response to corresponding external requests received from the host and/or internal requests generated within the memory system 10. For purposes of the description that follows, memory system operations executed under the control of the memory controller 200 that are not specifically read, write or erase operations will be referred to as "background operations" since they tend to be executed in the background of user generated data requests.

As will be appreciated by those skilled in the art, the memory device 100 will execute a write (or program) operation, read operation, and/or erase operation in accordance with an address (ADDR), one or more command(s) (CMD), and one of more control signal(s) (CTRL) received from the memory controller 200. During a program operation, write data (DATA) is also received from the memory controller 200, and during a read operation, read data (DATA) is returned from the memory device 100 to the memory controller 200.

In the illustrated embodiment of FIG. 1, the program order manager 210 may be used to store and manage "program order information" generated in relation to program operations executed by the memory device 100. In certain embodiments of the inventive concept, this program order information will take the form of "program order stamps" or POSs that are respectively associated with one or more operations executed by the memory device 100. Thus, each POS indicates a relative temporal relationship between operations executed over a number of memory groups defined within the memory cell array 110. Hence, the program order information may be information that correlates memory group(s) with POS(s) for one or more executed operations.

For example, when program operation(s) or erase operation(s) are sequentially or simultaneously performed in relation to memory group(s), the program order manager 210 may generate corresponding POS(s) indicating an order in which the program/erase operation(s) are applied to the memory group(s). The program order manager 210 may also store as program order information the POS(s), including indication(s) of the involved memory group(s).

Thus, the program order manager 210 may sequentially store POSs according to address(es) associated with memory group(s) in an order that allows subsequent searching of the POSs using, for example, the address(es) of the memory groups. Alternately, the program order manager 210 might store memory group address(es) using an indexed arrangement or listing of POS(s), such as a sequentially increasing listing of POSs. Thereafter, the indexed POSs may be searched to identify one or more memory group address(es).

In certain embodiments of the inventive concept, the program order manager 210 may store program order information in designated area(s) (e.g., particular memory group(s) or memory group portion(s)) of the memory cell area 110. Alternately, the program order manager 210 may store program order information in one or more meta area(s) within the memory cell array 110. Alternately or additionally, the program order manager 210 may store program order information in a buffer memory or buffer memory portion, where the buffer memory may be disposed in the memory controller 200 or memory device 100. Where ever the program order information is stored in the memory system 10, it is advisable to store it in non-volatile memory. In this manner, the program order information may be retained should power to the memory system 10 be interrupted. In certain embodiments of the inventive concept as suggested above, the program order information may be temporarily stored in the memory controller 200, thereby improving the operating speed of the memory system 10.

With the program order information stored in the memory system 10, the operation controller 220 may be used to control the execution of various operations by the memory device 100 in relation to the established memory groups. For example, the operation controller 220 may cause various operations (both background and non-background) to be differently executed in relation to a memory group in view of a program order information associated with the memory group. That is, a POS may be assigned a relative priority (e.g., a relatively higher or lower value) with respect to other POSs. In this regard, the operation controller 220 may predict data retention conditions for the respective memory groups based on stored program order information, and may then differently control the execution of various operations directed to a particular memory group depending on the relative (long or short) data retention time for the memory group.

For example, the operation controller 220 may perform a read operation using a relatively low read voltage on a memory group having a relatively long data retention time based on program order information. Alternatively, the operation controller 220 may periodically perform a "reclaim operation" on a memory group having a relatively long data retention time based on program order information. Alternatively, the operation controller 220 may preferentially perform a "garbage collection operation" on a memory group having a relatively long data retention time based on program order information. Alternatively, the operation controller 220 may efficiently perform a "wear-leveling operation" on the memory device 100 in view of stored program order information. Certain exemplary operations, the execution of which being controlled by the operation controller 220, will be described hereafter with reference to FIG. 16.

Figure 2:
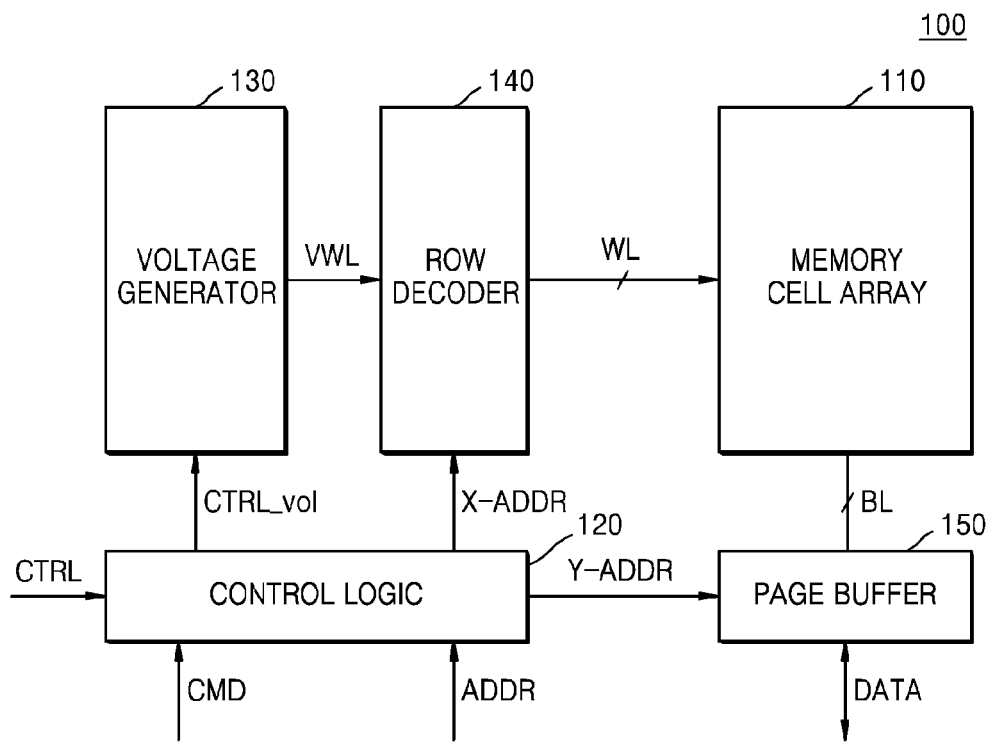
FIG. 2 is a block diagram further illustrating a memory device of FIG. 1.

FIG. 2 is a block diagram further illustrating the memory device 100 of FIG. 1.

Referring to FIG. 2, the memory device 100 comprises in addition to the memory cell array 110, a control logic 120, a voltage generator 130, a row decoder 140, and a page buffer 150. Although not shown in FIG. 2, the memory device 100 may further include various input/output circuitry and related input/output interface(s).

Although not shown in FIG. 2, those of ordinary skill in the art will understand that the memory cell array 110 may be connected to at least one string selection line SSL and at least one ground selection line GSL in various configurations.

When a set of control voltages including an erase voltage is selectively applied to the memory cell array 110, one or more memory cells memory cells may have their "data state" (e.g., as exhibited by a corresponding threshold voltage) changed to an erase state (E). Similarly, when a set of control signals including a program voltage is selectively applied to the memory cell array 110, one or more memory cells may have their data state changed to a desired program state (P, P1, P2 ... $P_N$). Thus, where a target memory cell for program operation is a SLC, the data state of the memory cell will be either the erase state E or a program state P. Where the target memory cell is configured to operate as a N-bit MLC, its data state may be one of the erase state E or ($2^N-1$) program states (e.g., for a 2-bit MLC, P1, P2 or P3 and for a 3-biT MLC P1, P2, P3, P4, P5, P6 and P7). Depending on the configuration of the constituent memory cells, the memory blocks of the memory block 100 may include single-level memory cell blocks, and/or N-bit memory cell blocks.

The control logic 120 may be used to define the various output control signals applied to the memory device 100 necessary to control the execution of various operations, such as erase, read and write operations in response to one or more command(s), address(es) and control signal(s) received from the memory controller 200. That is, the various control signals provided by the control logic 120 may be applied to the voltage generator 130, row decoder 140, page buffer 150, etc. For example, the control logic 120 may apply a voltage control signal (CTRL_vol) to the voltage generator 130, a row address (X_ADDR) to the row decoder 140, and a column address (Y_ADDR) to the page buffer 150 to control the execution of various operations.

Those skilled in the art will understand that the definition and provision of control signals generated by the control logic 120 within the memory device 100 is a matter of design choice and will vary by desired operation.

The voltage generator 130 may be used to generate various control voltages necessary to execute a desired operation within the memory cell array 110 based on the voltage control signal received from the control logic 120. Thus, the voltage generator 130 may be used to generate one or more word line driving voltage(s) VWL used to drive the word lines WL of the memory cell array. Various word line driving voltages typically used during program, read and erase operations may be designated as a "program voltage" (or write voltage), a "read voltage", an "erase voltage", an "inhibit voltage", or a "program verify voltage", etc. Although not shown in FIG. 2, the voltage generator 130 may be used to generate a string selection line driving voltage VSSL for driving the plurality of string selection lines SSL and a ground selection line driving voltage VGSL for driving the plurality of ground selection lines GSL.

In the illustrated embodiment of FIG. 2, the row decoder 140 is connected to the memory cell array 110 via the word lines WL and may be used to activate selected word lines among the plurality of word lines WL in response to the row address received from the control logic 120. Thus, during a read operation, the row decoder 140 may apply a read voltage to a selected word line and may apply an inhibit voltage to non-selected word lines. During a program operation, the row decoder 140 may apply a program voltage to a selected word line and may apply an inhibit voltage to non-selected word lines.

The page buffer 150 is connected to the memory cell array 110 via the bit lines BL. During a read operation, the page buffer 150 may output the read data (DATA) stored in the memory cell array 110 while operating as a sense amplifier, and during a program operation, the page buffer 150 may apply write data (DATA) received from the memory controller 200 to the memory cell array 110 while operating as a write driver.

Figure 3:
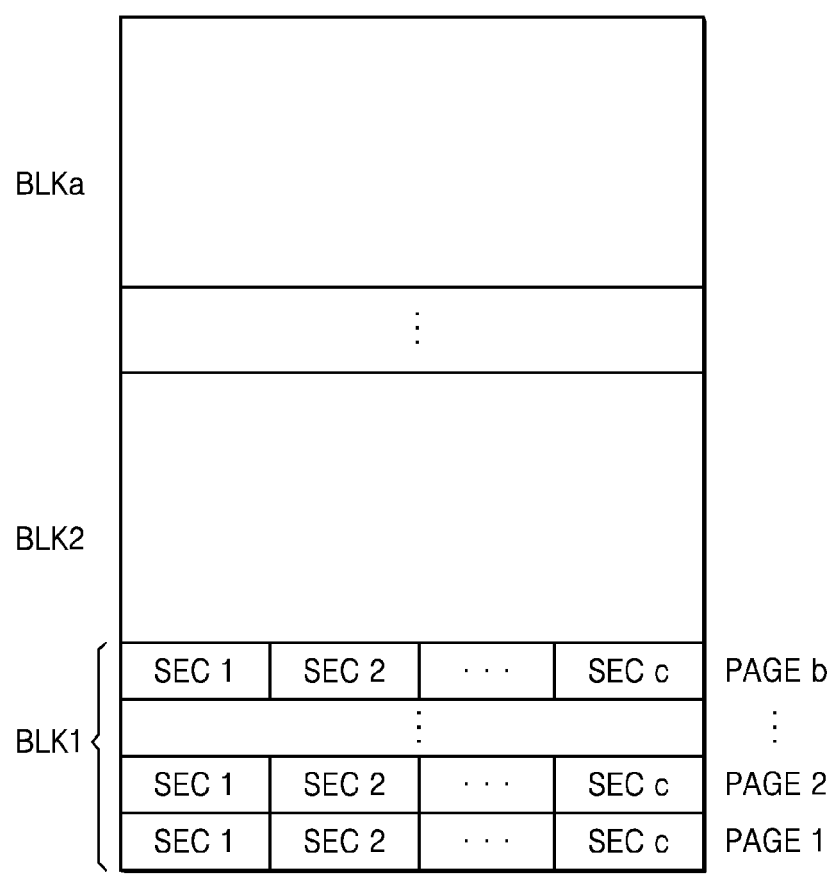
FIG. 3 is a conceptual diagram illustrating in one example a memory cell array of FIG. 2.

FIG. 3 is a conceptual diagram illustrating in one example the memory cell array 110 of FIG. 2. Referring to FIG. 3, the memory cell array 110 is assumed to be a NAND flash memory cell array including a number of defined memory blocks (e.g., first through ath memory blocks, BLK1 through BLKa). Each of the first through ath memory blocks is further divided into a number of pages (e.g., PAGE1 through PAGEb), where each page is still further divided in sectors (e.g., SEC1 through SECc).

Figure 4:
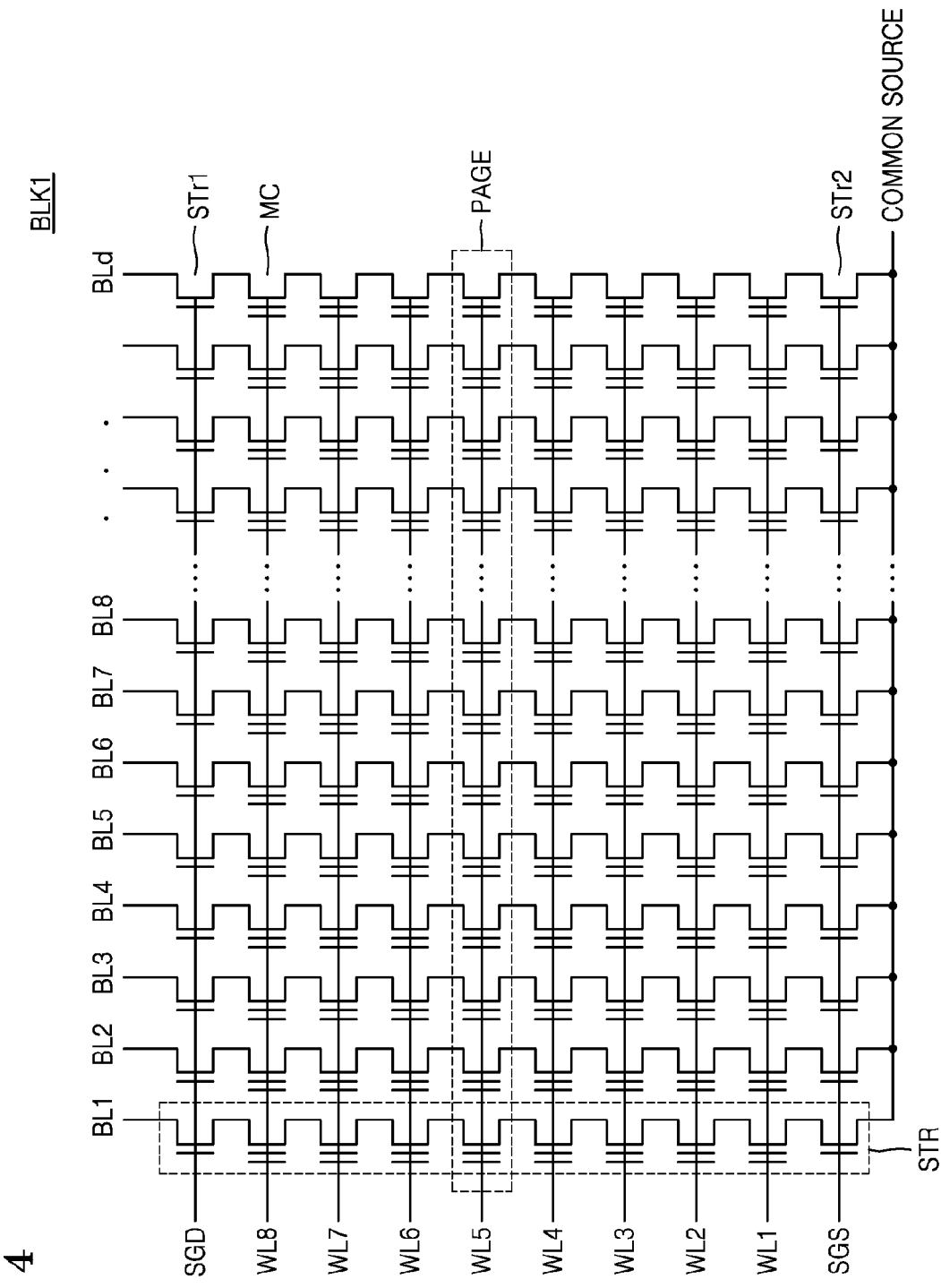
FIG. 4 is a partial circuit diagram further illustrating a memory block of the memory cell array shown in FIG. 3.

FIG. 4 is a partial circuit diagram further illustrating the first memory block BLK1 of the memory cell array 110 shown in FIG. 3. Referring to FIG. 4, the first memory block BLK1 is assumed to be a horizontal NAND flash memory block, and each of the first through ath memory blocks BLK1 through BLKa of FIG. 3 may be formed as shown in FIG. 4. Thus, the first memory block BLK1 may include a number of strings (STR) consisting of serially connected memory cells (e.g., 8 memory cells). Each of the strings STR may include a drain selection transistor STr1 and a source selection transistor STr2 that are respectively connected to both ends of the memory cells MC that are serially connected. The number of the strings STR, the number of the word lines WL, and the number of the bit lines BL is a matter of design choice and will vary with different embodiments.

The NAND flash memory device of FIG. 4 allows erase operation to be executed in units of memory blocks, while allowing program operations to be executed in units of pages corresponding to word lines WL1 through WL8. For example, assuming that the memory cells (MC) of FIG. 4 are SLC, one page may correspond to each word line. Alternatively, when the memory cells of FIG. 4 are N-bit MLC, N pages may correspond to each word line.

Figure 5:
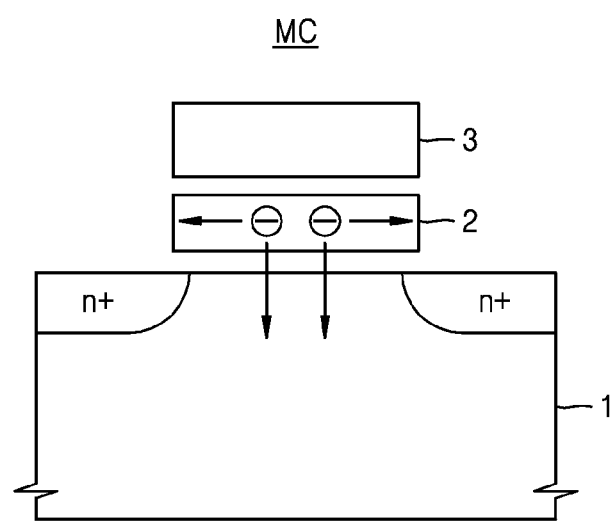
FIG. 5 is a cross-sectional view illustrating in one example a type of memory cell may be used in the memory block of FIG. 4.

FIG. 5 is a cross-sectional view illustrating in one example a type of memory cell MC that may be used in the first memory block BLK1 of FIG. 4. Referring to FIG. 5, the memory cell MC includes a channel region 1, a charge storage layer 2, and a control gate 3. For example, the charge storage layer 2 may include a floating gate that is a conductor, and in this case, the memory cell MC may be referred to as a floating gate structure cell. Alternatively, the charge storage layer 2 may include, for example, silicon nitride (SiN) that is a non-conductor, and in this case, the memory cell MC may be referred to as a charge trap flash (CTF) cell.

In order to perform a program operation on the memory cell MC, a relatively high program voltage may be applied to the control gate 3 and a relatively low voltage (for example, 0 V) may be applied to the channel region 1. Since an electric field is formed in a direction from the control gate 3 to the channel region 1 according to such a bias condition, charges, for example, electrons, may move from the channel region 1 to the charge storage layer 2, and thus the memory cell MC may be programmed.

When the memory device 100 is a flash memory device, data that is stored in the memory cell MC may be read according to the threshold voltage Vth of the memory cell MC. In this case, the threshold voltage Vth of the memory cell MC may be determined by the number of electrons that are stored in the charge storage layer 2. As the number of electrons that are stored in the charge storage layer 2 increases, the threshold voltage Vth of the memory cell MC increases.

As the time following execution of a last-executed program operation applied to the memory cell MC increases (that is, as the "retention time" for the programmed memory cell MC increases), the charge loss for the memory cell MC also increases. Thus, as time passes, some of the electrons trapped in the charge storage layer 2 during a program operation are rearranged—moving for example to the channel region 1 or moving to the charge storage layer 2. This loss of electrons reduces the threshold voltage Vth of the memory cell MC over time, thereby causing a spreading of the desired threshold voltage distribution for the memory cells MC.

Figure 6:
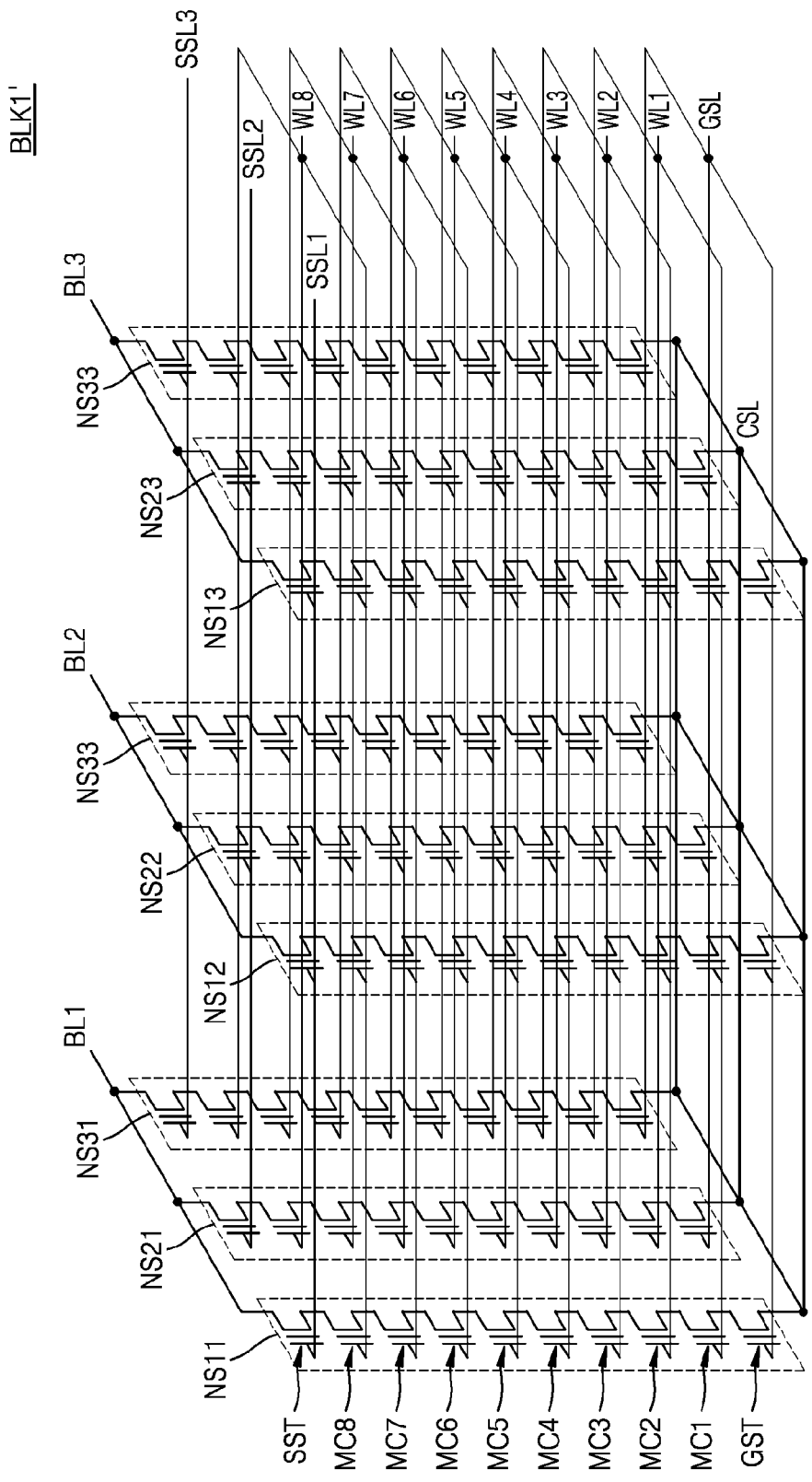
FIG. 6 is a partial circuit diagram further illustrating in another example the first memory block of the memory cell array of FIG. 3.

FIG. 6 is a partial circuit diagram further illustrating in another example the first memory block BLK1' of the memory cell array 110 of FIG. 3. Referring to FIG. 6, the first memory block BLK1' is assumed to be a vertical NAND flash memory block, and the first through ath memory blocks BLK1 through BLKa of FIG. 3 may be formed as shown in FIG. 6. The first memory block BLK1' may include a plurality of NAND strings NS11 through NS33, the plurality of word lines WL1 through WL8, a plurality of bit lines BL1 through BL3, the ground selection line GSL, a plurality of string selection lines SSL1 through SSL3, and a common source line CSL. The number of the NAND strings, the number of the word lines, the number of the bit lines, the number of the ground selection lines, and the number of the string selection lines may be changed in various ways according to exemplary embodiments.

The NAND strings NS11 through NS33 are connected between the bit lines BL1 through BL3 and the common source line CSL. Each of the NAND strings NS11 through NS33 (for example, NS11) may include a string selection transistor SST, the plurality of memory cells MC1 through MC8, and a ground selection transistor GST that are serially connected.

The string selection transistor SST is connected to the string selection lines SSL1 through SSL3. The plurality of memory cells MC1 through MC8 are respectively connected to the word lines WL1 through WL8. The ground selection transistor GST is connected to the ground selection line GSL. The string selection transistor SST is connected to the bit line BL corresponding to the string selection transistor SST, and the ground selection transistor GST is connected to the common source line CSL.

Word lines having the same height (e.g., the word lines WL1) are commonly connected, and the string selection liens SSL1 through SSL3 are separated from one another. When memory cells that are connected to the first word lines WL1 and belong to the NAND strings NS11, NS12, and NS13 are programmed, the first word line WL1 and the first string selection line SSL1 are selected.

Figure 7:
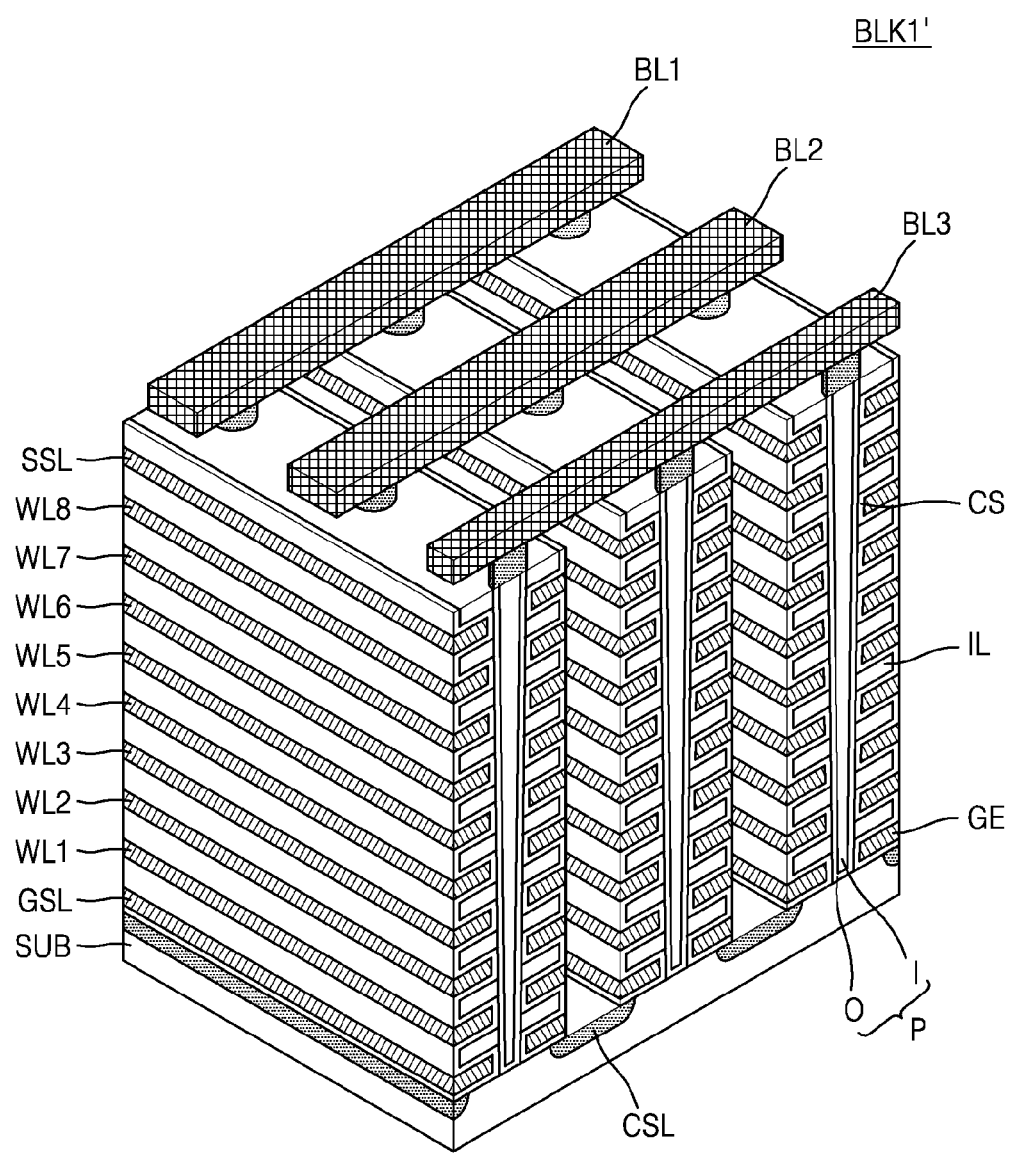
FIG. 7 is a perspective view illustrating one possible implementation example for the first memory block of FIG. 6.

FIG. 7 is a perspective view illustrating one possible implementation example for the first memory block BLK1' of FIG. 6. Referring to FIG. 7, the first memory block BLK1' may be formed in a direction that is perpendicular to a substrate SUB. The common source line CSL is disposed in the substrate SUB, and gate electrodes GE and insulating layers IL are alternately stacked on the substrate SUB. Also, a charge storage layer CS may be formed between the gate electrodes GE and the insulating layers IL.

When the plurality of gate electrodes GE and the plurality of insulating layers IL that are alternately stacked are vertically patterned, a pillar P having a V-shape is formed. The pillar P passes through the gate electrodes GE and the insulating layers IL and is connected to the substrate SUB. An outer portion O of the pillar P may be formed of a semiconductor material and may function as a channel region, and an inner portion I of the pillar P may be formed of an insulating material such as silicon oxide.

The gate electrodes GE of the first memory block BLK1' may be connected to the ground selection line GSL, the plurality of word lines WL1 through WL8, and the string selection line SSL. The pillar P of the first memory block BLK1' may be connected to the plurality of bit lines BL1 through BL3. Although the first memory block BLK1' includes two selection lines GSL and SSL, eight word lines WL1 through WL8, and three bit lines BL1 through BL3 in FIG. 7, the number of the elements is not limited thereto and various modifications may be made.

Figure 8A:
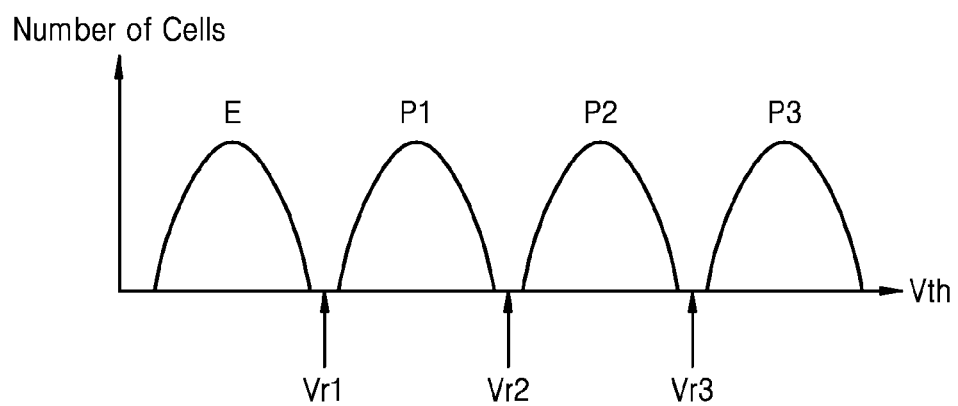
FIG. 8A is a graph illustrating desired threshold voltage distributions defined by various program operations applied to the memory device, assuming a 2-bit MLC.

FIG. 8A is a graph illustrating desired threshold voltage distributions defined by various program operations applied to the memory device 100, assuming a 2-bit MLC. As will be seen hereafter, since intervals between adjacent threshold voltage distributions in a MLC are more narrow that the intervals for a SLC, serious problems may arise when even slight changes in the threshold voltage of a MLC occur. For example, each one of first through third read voltages Vr1, Vr2, and Vr3 corresponding to a default level for a data state may be initially set. Here, the first read voltage Vr1 has a level that discriminates between the erase state E and a first program state P1. the second read voltage Vr2 has a level that discriminates between the first program state P1 and the second program state P2, and the third read voltage Vr3 has a level that discriminate between the second program state P2 and third program state P3.

Thus, when the first read voltage Vr1 is applied to a control gate of the memory cell MC, the memory cell MC having the erase state E is turned ON and the memory cell MC having the first program state P1 remains OFF. When the memory cell MC is turned ON, current flows through the memory cell MC, but when the memory cell MC is OFF, current does not flow. Accordingly, the data stored in the memory cell MC may be distinguished according to whether the memory cell MC is turned ON or OFF.

In an illustrated embodiment of FIG. 8A, when the first read voltage Vr1 is applied and the memory cell MC is turned ON, a data value of '1' may be stored. When the memory cell MC is turned OFF, a data value of '0' may be stored. However, the inventive concept is not limited thereto, and in another exemplary embodiment, when the first read voltage Vr1 is applied and the memory cell MC is turned on, data '0' may be stored and when the memory cell MC is turned off, data '1' may be stored. As such, allocation of a logic level of data may vary according to embodiment.

Figure 8B:
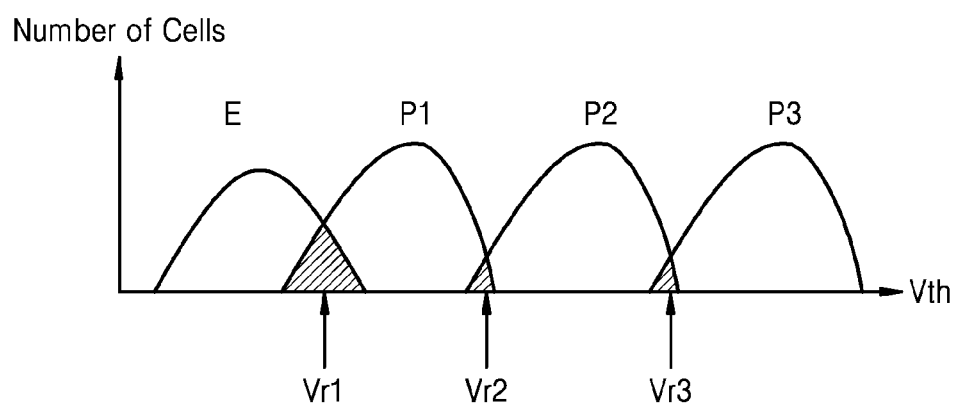
FIG. 8B is a graph illustrating threshold voltage distributions following a period of time following a last-executed program operation direct to memory cells of the memory device previously programmed to the threshold voltage distributions of FIG. 8A.

FIG. 8B is a graph illustrating threshold voltage distributions following a period of time following a last-executed program operation direct to memory cells of the memory device 100 previously programmed to the threshold voltage distributions of FIG. 8A.

Referring to FIG. 8B, as retention time increases, the threshold voltage Vth of the memory cells MC programmed to the erase state E or one of the first through third program states P1 through P3 decrease, thereby obtaining the degraded threshold voltage distributions of FIG. 8B. A read error may occur for the memory cell MC having a threshold voltage that drifts into one of the cross-hatched areas, thereby reducing the reliability of the memory device 100.

For example, when a read operation is performed on the memory device 100 using the first read voltage Vr1, a memory cell MC having a threshold voltage in the hatched state may be determined to have the erase state E due to a reduction in the threshold voltage Vth although the memory cell MC was previously programmed to the first program state P1. Accordingly, an error occurs during the read operation, thereby reducing the reliability of the memory device 100.

When data is read from the memory device 100, a raw bit error rate (RBER) may vary according to a voltage level of a read voltage, and an optimum voltage level of the read voltage may be determined according to a distribution shape of the memory cell MC. Accordingly, as a distribution of the memory cell MC changes, the optimum voltage level of the read voltage that is necessary to read the data from the memory device 100 may change. Hence, it is necessary to determine the optimum voltage level of the read voltage by changing the voltage level of the read voltage based on a change in the distribution. In this case, in order to efficiently determine the optimum voltage level of the read voltage, it is necessary to reduce power consumption and an operation time by simplifying a mathematical operation.

A case where the memory cell MC is a multi-level cell has been explained with reference to FIGS. 8A and 8B. However, the inventive concept is not limited thereto, and the memory cell MC may be SLC or any version of an N-bit MLC.

Figure 9:
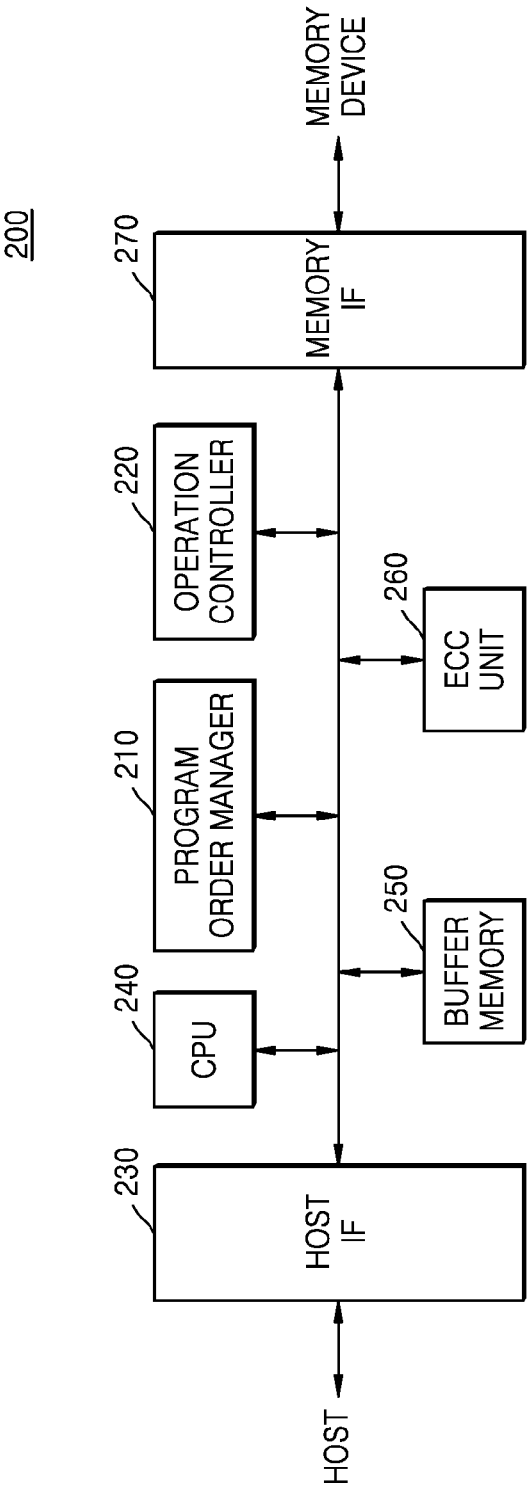
FIG. 9 is a block diagram further illustrating in one example the memory controller of FIG. 1.

FIG. 9 is a block diagram further illustrating in one example the memory controller 200 of FIG. 1.

Referring to FIG. 9, the memory controller 200 comprises in addition to the program order manager 210 and operation controller 220, a host interface 230, a central processing unit (CPU) 240, a buffer memory 250, an error correction code (ECC) unit 260, and a memory interface 270.

The host interface 230 may be used to receive request(s) associated with a desired memory system operation from a host. That is, the host interface 230 may receive various requests such as a data read request and a data write request from the host, and generate various internal signals for the memory operation of the memory device 100 in response to the various requests.

In this regard, the memory controller 200 may be configured to communicate with the host via at least one selected interface protocol selected from among a variety of possible interface protocols such as a universal serial bus (USB), multimedia card (MMC), peripheral component interconnect-express (PCI-E), advanced technology attachment (ATA), serial-ATA, parallel-ATA, small computer system interface (SCSI), enhanced small disk interface (ESDI), and integrated drive electronics (IDE).

The CPU 240 may be used to control the overall operation of the memory controller 200. For example, the CPU 240 may control various functional blocks related to the memory operation of the memory device 100. Although the program order manager 210 and the operation controller 220 are shown as separate blocks in the present exemplary embodiment, the program order manager 210 and the operation controller 220 may operate as a part of the CPU 240. Exemplary operation of the program order manager 210 will be described in some additional detail with reference to FIGS. 10A through 15. Also, a more detailed exemplary operation for the operation controller 220 will be explained below with reference to FIG. 16.

The buffer memory 250 may be used to temporarily store read data to be communicated via the host interface 230 to the host, and/or write data received from the host by the memory device 100. The buffer memory 250 may also be used to temporarily store information necessary to the control of the memory device 100. For example, the buffer memory 250 may be used in certain embodiments to temporarily store program order information generated by the program order manager 210. In this regard, the buffer memory 250 may be implemented using dynamic RAM (DRAM), static RAM (SRAM), or a combination of the DRAM and the SRAM.

The ECC unit 260 may be used to perform data encoding of write data and data decoding on read data using one or more of various algorithms such as a Reed-Solomon (RS) code, a Hamming code, or a cyclic redundancy code (CRC) in order to generate an error detection result and/or error correction result. For example, the ECC unit 260 may be used to detect an error bit by comparing a parity bit generated and stored when write data is programmed, with a corresponding parity bit generated when data is read, and may correct the error bit by performing a predetermined logic operation (e.g., an exclusive OR operation or XOR) on the detected error bit.

The memory interface 270 may be used to interface with the memory device 100 to transmit and receive various signals (e.g., command(s), address(es), and/or control signal(s)) as generated in the memory controller 200.

FIGS. 10A, 10B, 10C 10D and 10E (collectively FIGS. 10A thought 10E) are conceptual diagrams illustrating an approach to managing program order information according to certain embodiments of the inventive concept.

Figure 10A:
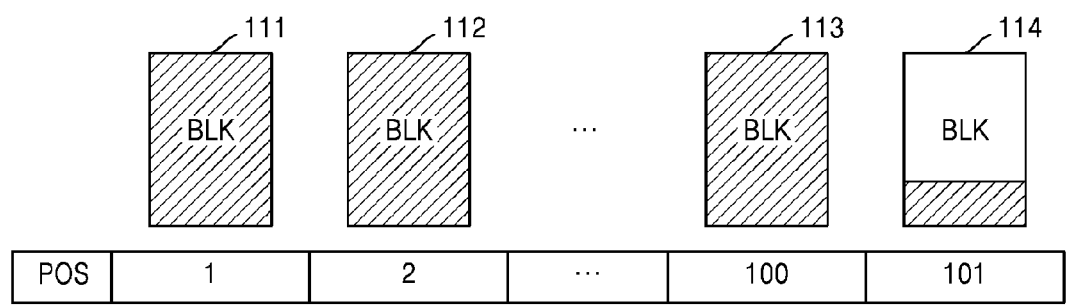
FIGS. 10A through 10E are conceptual diagrams illustrating an approach to managing program order information, according to certain embodiments of the inventive concept.
Figure 10B:
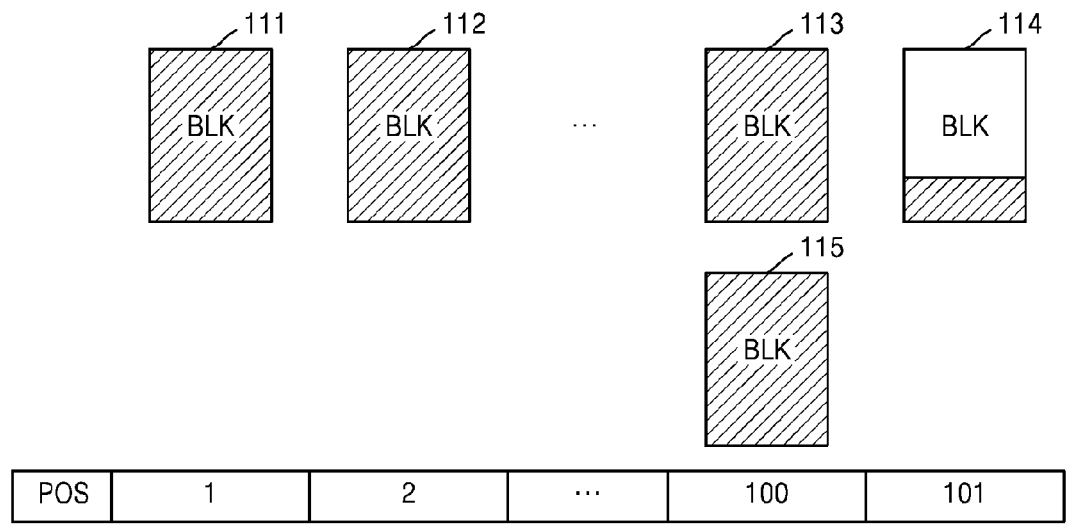
Figure 10C:
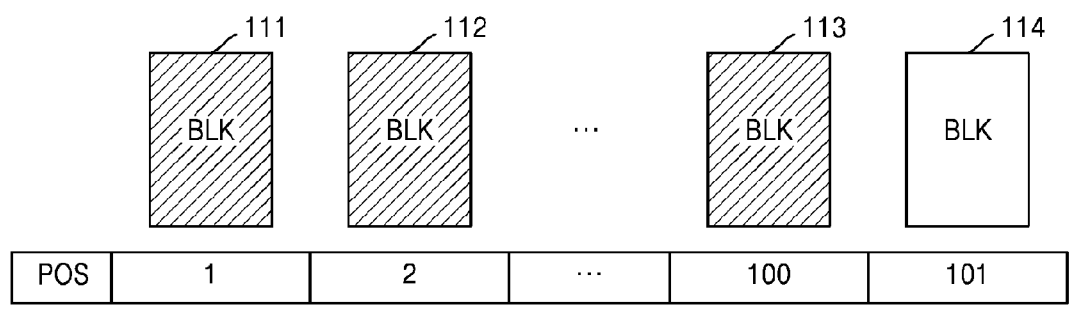
Figure 10D:
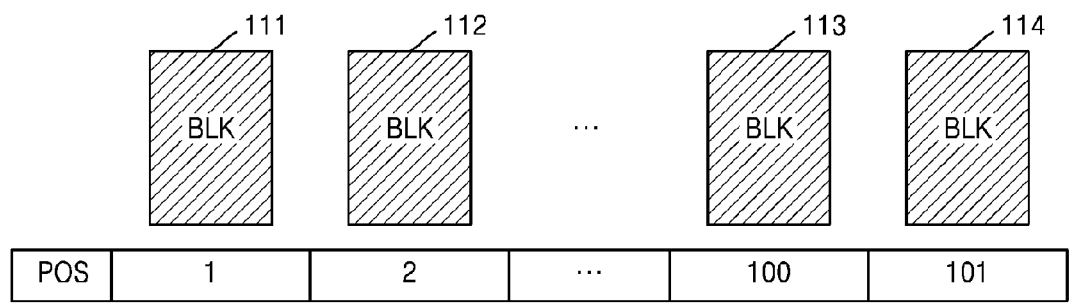
Figures 10E, 11:
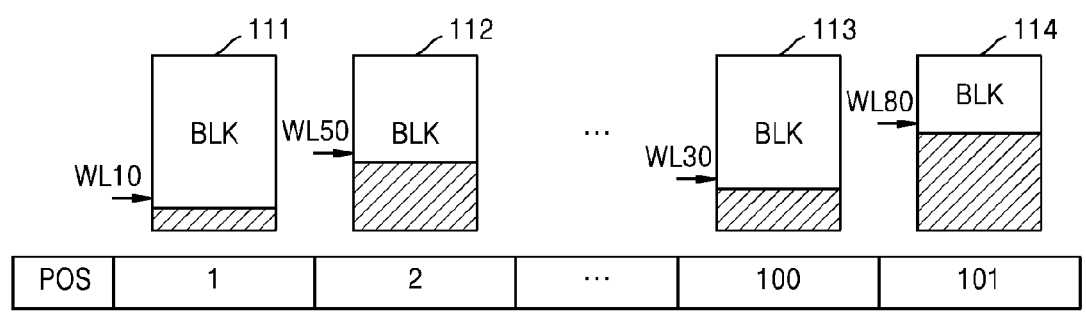
FIG. 11 is a conceptual diagram illustrating a memory area format that may be used to store respective program order stamp (POS) values according to certain embodiments of the inventive concept.

Management of the program order information, as illustrated in FIGS. 10A through 10E, may be performed by the program order manager 210 of FIGS. 1 and 9. FIGS. 10A through 10D illustrate operation of the program order manager 210 when a plurality of memory groups are divided according to memory blocks, and FIG. 10E illustrates operation of the program order manager 210 when the plurality of memory groups are divided according to word lines.

Referring to FIG. 10A, the program order manager 210 may allocate or assign a POS to a memory block when a program operation or an erase operation is directed to a particular memory block. When a program operation is first executed on a first memory block 111 among a plurality of memory blocks included in the memory device 100, the priority (or "value") of the corresponding POS for the first memory block 111 is assumed to be '1'. A program operation next (second) performed on a second memory block 112, is assumed to have a "POS value" of '2'. This continues until a 100th program operation directed to a third memory block 113 is allocated a POS value of '100', and a $101^{st}$ program operation directed to a fourth memory block 114 is allocated a POS value of '101'.

Now, referring to FIG. 10B, the program order manager 210 is further assumed to allocate the same POS value (e.g., 100) to a plurality of memory blocks (e.g., third memory block 113 and fifth memory block 115) when program operations are simultaneously or sequentially directed to the plurality of memory blocks. In this regard, the program order manager 210 may allocate the same POS to a plurality of memory blocks when erase operations are simultaneously or sequentially performed on the plurality of memory blocks. In other words, when a plurality of memory blocks are simultaneously or coincidently allocated as active memory blocks they may be assigned the same POS value.

When program operation(s) are simultaneously directed to the third memory block 113 and fifth memory block 115, the same POS value may be allocated for the third memory block 113 and fifth memory block 115. For example under certain conditions, such as when the intervening time between a first program operation executed with respect of the third memory block 113 and a second program operation executed with respect to the fifth memory block 115 is less than a given critical time (e.g., 10 seconds), the same POS value may be allocated to both the third memory block 113 and fifth memory block 115. Thus, as will be appreciated from the foregoing example, there may be many different conditions whereby multiple memory groups may share a same POS.

Referring to FIG. 10C, the program order manager 210 may allocate a POS to a particular memory group at the beginning of an operation (e.g., a program operation or an erase operation) directed to the memory group. For example, when a program operation directed to the fourth memory block 114 begins (or starts) or when an erase operation directed to the fourth memory block 114 begins, a corresponding POS value may be allocated to the fourth memory block 114.

Alternately, referring to FIG. 10D, the program order manager 210 may allocate a POS value to a memory group only after an operation directed to the memory group is completed.

Referring to FIG. 10E, the program order manager 210 may divide a plurality of memory blocks according to word lines and may generate program order information accordingly. For example, assuming that the memory device 100 is a vertical NAND flash memory device, a program operation will be executed over a plurality of word lines arranged in a memory block according to a defined word line order between (e.g.,) a ground selection line GSL and a string selection line SSL. Thus, one POS value may be allocated in relation to a particular word line of a memory block, and another POS value may be allocated in relation to another word line of the memory block. In this manner, a coherent (or predictive) operation order may be established in relation to a word line order.

In FIG. 10E, the program order manager 210 may allocate a POS value to a word line when a program operation or an erase operation is performed on the word line. When a program operation is repeatedly performed in relation to a word line, the program order manager 210 may allocate the POS value to the word line as initially allocated when the program operation was first executed. Alternately, when a program operation is repeatedly performed on a word line, the program order manager 210 may allocate a POS value to the word line corresponding to the last executed program operation. Further, the program order manager 210 may allocate a POS value to a word line when a reprogram operation is performed on the word line or when a fine program operation is completed.

In the illustrated example of FIG. 10E, when a program operation is first performed on a word line WL10 included in the first memory block 111, a POS value corresponding to the word line WL10 is '1'. When the program operation is next performed on a word line WL50 included in the second memory block 112, a POS value corresponding to the word line WL50 is '2'. When the $100^{th}$ program operation is performed on a word line WL30 included in the third memory block 113, a POS value corresponding to the word line WL30 is '100', and when a $101^{st}$ program operation is performed on a word line WL80 included in the fourth memory block 114, a POS value corresponding to the word line WL80 is '101'.

In this illustrated example, since a plurality of memory groups are divided according to word lines and program order information is generated according to the corresponding word line order, even when a program time difference between different word lines included in the same memory block is large, the reliability of the memory device 100 may be ensured. For example, when a subsequent program operation is not performed in the memory device 100 for a long time following a previous program operation, the corresponding program times as between different word lines that are included in the same block may be quite large. Alternatively, when power is not supplied for a long time to the memory device 100 and then power supply is resumed, a programming time difference between different word lines included in the same block may be quite large.

FIG. 11 is a conceptual diagram illustrating a memory area format that may be used to store respective POS values according to certain embodiments of the inventive concept. The program order manager 210 may allocate a POS to each memory group and then store the POS in a designated area of the memory group. Thus, for example, when a plurality of memory groups are divided according to memory blocks, a 4-byte memory area may be allocated for the storage of respective POS values for each memory block. Using the exemplary data format illustrated in FIG. 11, the memory area may include a flag area (F_AR) and a POS area (POS_AR), where the flag area may be 1 bit and the POS area may be 31 bits in length. The flag area is an area storing a flag indicating whether the memory block is used in order to update a mapping table used to store, for example, a read voltage offset and the POS area is an area storing the corresponding read voltage offset. Here, the read voltage offset may be an offset associated with a default read voltage setting. Accordingly, a read operation may be executed in relation to a particular memory group according to program order information having the form of a corresponding read voltage level as determined by the read voltage offset.

In the context of the illustrated embodiment of FIG. 11, the program order manager 210 will reset the flag to '0' when a new POS is allocated. Accordingly, when the flag for a memory block is reset to '0', the program order manager 210 will update in order the mapping table using the memory block. In contrast, when the flag for a memory block is set to '1', the program order manager 210 will not use the memory block in order to update the mapping table.

When a memory group has a relatively greater charge loss than other memory groups corresponding to adjacent POSs due, for example, to a read disturbance, the program order manager 210 may set the flag to '1', and the memory group may be designated as an "outlier memory group". As such, since the flag of the outlier memory group is set to '1', a read result from the outliner memory group will not be used in order to update the mapping table, and a read retry operation may be performed on the outlier memory group.

Referring again to FIG. 11, the POS area is an area for storing a POS allocated to a particular memory block. Assuming that the POS area has a length of 31 bits and that the size of the corresponding memory block is 1 TB, the POS of the memory block may be stably stored until a program/erase cycle for the memory block is repeated 12,000 times.

FIG. 12 is an illustration of a first table (TABLE1) listing an example of program order information.

Referring to FIG. 12, the program order manager 210 is assumed to sequentially store a program order table (TABLE1) using POSs indexed with corresponding addresses for a plurality of memory groups. In the illustrated example, it is assumed that the memory groups are divided according to memory block units, and that the program order table store POSs according to addresses corresponding to respective memory blocks. Alternatively, when the memory groups might be divided according to word line units, and the program order table might store POSs according to addresses corresponding to the word lines.

Reference numeral '121' of FIG. 12 denotes the program order table (TABLE1) when a $1^{st}$ program operation executed by the memory device 100. When an address of a memory group to which the $1^{st}$ program operation is directed is assumed to be '2', a POS value corresponding to the memory group having the address of '2' will be '1'. In this case, since program operations have not been performed in relation to the remaining (N−1) memory groups, the respective POS values for the remaining (N−1) memory groups will be '0'.

By way of comparison, the reference numeral '122' in FIG. 12 denotes the program order table (TABLE1) when a $30,000^{th}$ program operation is executed by the memory device 100. When an address of a memory group to which the $30,00^{th}$ program operation is directed is assumed to be 'K', a POS value corresponding to the memory group having the address 'K' will be '30000'.

As described above with reference to FIGS. 10A through 10E, the program order manager 210 may allocate a POS to a given memory group when a program operation, an erase operation, or some other type of operation is directed to the given memory group. The allocation of a POS may be done at the beginning of the operation-to-be-executed or following execution of the operation. And memory groups may be variously designated (e.g., on a memory block basis, or on a word line basis).

FIG. 13 is an illustration of a second table (TABLE2) listing another example of program order information.

Referring to FIG. 13, the program order manager 210 is assumed to store corresponding addresses for sequentially increasing POSs in the program order table. Thus, a POS value may be used to search for a corresponding address in the program order table. Here again, related memory groups may be variously defined according to memory block, word line, etc. As indicated by the program order table shown in FIG. 13, a 1$^{st}$ memory group having a POS value of 1 (i.e., a memory group to which a 1$^{st}$ executed program operation is directed) may have an address of '2843', while an Mth memory group having a POS value of 'M' may have an address of '27'. Since the program order table (TABLE2) stores memory group addresses indexed by corresponding POSs, the time required to search the program order information in order to ascertain a memory group address during various control operations may be markedly reduced.

Figures 14A, 14B:
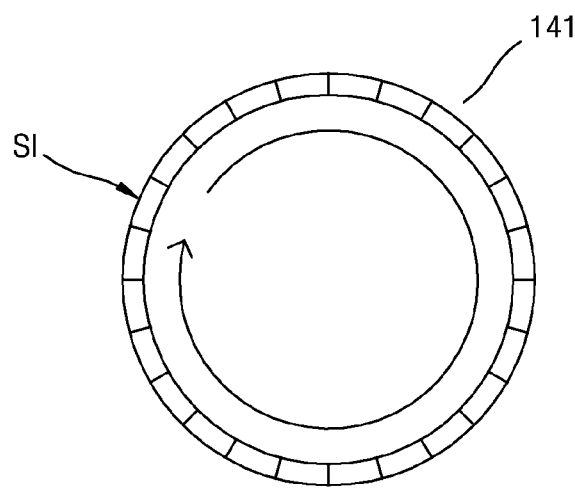
FIG. 14A is a conceptual illustration of a circular or ring buffer and FIG. 14B is a table listing another example of program order information.

FIG. 14A is a conceptual illustration of a circular or ring buffer, and FIG. 14B is a table listing another example of program order information.

Referring to FIG. 14A, the program order manager 210 may store program order information by using the circular buffer 141. Other approaches might alternately be used, for example, the program order manager 210 may store program order information using a first-in first-out (FIFO) buffer.

The circular buffer 141 assumes fixed size data that is continuously input to, and continuously output from the buffer. Data is first input to the circular buffer 141 at a starting address or start index value (SI).

Referring to FIG. 14B, addresses may be uniquely associated with the continuous memory space provided by the circular buffer 141, such that the same address may be stored in relation to different buffer indices. For example, an address '10' may be stored in relation to both index values '0' and '5'. In the illustrated example of FIG. 14B, a latest index may be determined using the start index SI that indicates, for example, a value of '3'.

Figure 15:
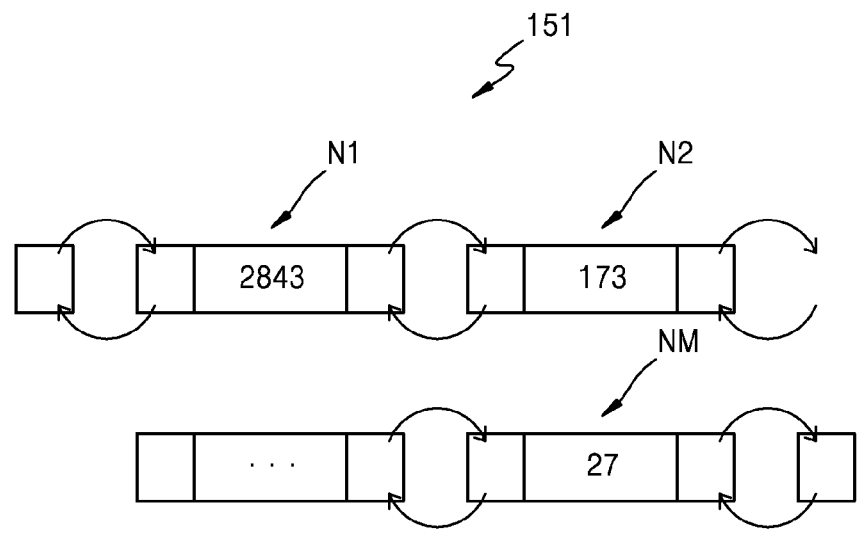
FIG. 15 is a conceptual diagram illustrating a doubly-linked list capable of storing program order information.

FIG. 15 is a conceptual diagram illustrating a doubly-linked list 151 capable of storing program order information.

Referring to FIG. 15, the program order manager 210 may store program order information by using the doubly-linked list 151. Alternately, program order information may be stored using a singly-linked list.

The doubly-linked list 151 is configured to include two pointers indicating a previous node and a next node, as well as and data corresponding to each node. Thus, each node is accessible from either traverse direction of the doubly-linked list. An address corresponding to a POS having a value of '1' and an address corresponding to a latest POS having a value of 'M' may be easily searched for by using the doubly-linked list 151.

In the illustrated example of FIG. 15, the program order manager 210 may store an address of a memory group in a data area of each node of the doubly-linked list 151. For example, a first node N1 may store an address '2843' corresponding to a POS having a value of '1', a second node N2 may store an address '173' corresponding to a POS having a value of '2', and an Mth node NM may store an address '27' corresponding to a POS having a value of 'M'.

As described above with reference to FIGS. 12, 13, 14A, 14B and 15, the program order manager 210 may store program order information using any one of a table, a linked list, a doubly-linked list, a circular buffer, a FIFO buffer, etc. Further, assuming the memory cells of the memory cell array 110 in the memory device 100 are configured for use as MLC, the program order manager 210 may manage corresponding program order information accordingly using multi-cell memory blocks, multiple data pages, etc. For example, the program order manager 210 may store first program order information associated with a first memory cell block, second program order information associated with a second memory cell block, etc., using one or more tables, linked lists, doubly-linked lists, circular buffers, FIFO buffers, etc.

Figure 16:
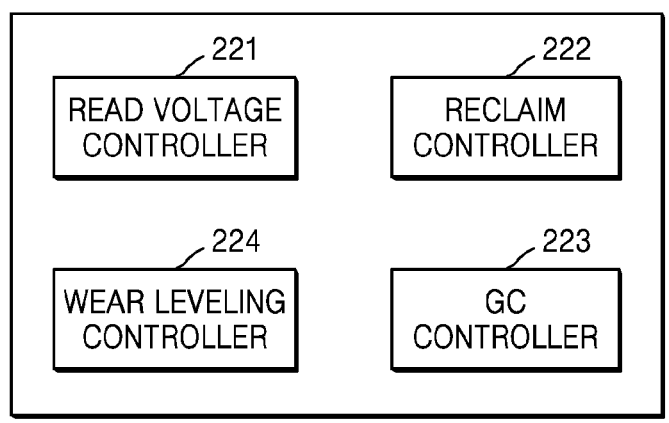
FIG. 16 is a block diagram further illustrating in one example the operation controller of FIG. 9, according to certain embodiments of the inventive concept.

FIG. 16 is a block diagram further illustrating in one example the operation controller 220 of FIG. 9 according to certain embodiments of the inventive concept.

Referring to FIG. 16, the operation controller 220 comprises a read voltage controller 221, a reclaim controller 222, a garbage collection controller 223, and a wear leveling controller 224.

The read voltage controller 221 may control the respective selection of read voltages for a plurality of memory groups based on program order information. For example, when a read request is received from a host or when a read command for the memory device 100 is generated, the read voltage controller 221 may be activated. That is, the read voltage controller 221 will identify a POS corresponding to a memory group to which the read operation is directed from among the plurality of memory groups based on the program order information, search for a read voltage offset corresponding to the identified POS, and then control execution of the read operation directed to the memory group using the read voltage offset.

Assuming memory groups are designated according to memory blocks, when sequentially executed read operations directed to a first address and a second address in the same memory block, the read voltage controller 221 need only determine a corresponding read voltage for the first read operation directed to the first address by referring to the program order information, and then use the read voltage to execute the second read operation directed to the second address without additional reference to the program order information. This efficient approach to the identification of a proper read voltage may also be used when memory groups are designated according to word lines.

The reclaim controller 222 may be used to control the execution of a reclaim operation performed on at least one memory group based on the program order information. Here, the reclaim controller 222 may be used to predict a data retention time based on a POS, and may control the memory device 100 to perform a reclaim operation on a memory group having a data retention time that exceeds a predetermined threshold, for example. A reclaim operation is an operation that essentially copies data stored in a memory group (e.g., one memory block) to another similarly sized memory group (e.g., another memory block).

When a reclaim operation is performed in relation to a memory group having a corresponding POS, the reclaim controller 222 may control the memory device 100 to perform the reclaim operation on at least one memory group corresponding to a POS that is close to the corresponding POS or prior to the predetermined POS. For example, when the reclaim operation is performed on a memory block corresponding to a POS having a value of '100', since memory blocks corresponding to a POS having a value equal to or less than '100' or memory blocks corresponding to a POS having a value that is close to '100' may have a high RBER, the reclaim controller 222 may control the memory device 100 to perform the reclaim operation on the memory blocks.

The reclaim controller 222 may control the memory device 100 to perform the reclaim operation on all of memory groups each corresponding to a POS that is equal to or less than a critical value. For example, when a difference between a newest POS and an oldest POS is greater than a specific value, the reclaim controller 222 may control the memory device 100 to perform the reclaim operation on a memory group corresponding to the oldest POS.

The garbage collection (GC) controller 223 may be used to variably control garbage collection operations performed on the memory device 100 based on program order information. Garbage data stored in the memory device 100 must be periodically collected in order to maintain an acceptable data storage capacity. That is, garbage collection operations convert memory blocks storing invalid data and possibly valid data into free memory blocks by copying valid data to another memory block, and then deleting all of the data currently stored in the memory block. Accordingly, when a number of free memory blocks currently available in the memory device 100 is insufficient to perform a requested write operation, a garbage collection operation must be performed before the write operation may be performed.

The garbage collection controller 223 may preferentially perform a garbage collection operation on memory groups having a corresponding POS that is equal to or less than a critical value, or the garbage collection controller 223 may determine a memory group on which a garbage collection operation should be performed based on information indicating a number of valid pages as well as the program order information.

The wear leveling controller 224 may be used to variably control execution of wear leveling operations performed by the memory device 100 based on program order information. A wear leveling operation is an operation that seeks to more uniformly distribute write cycles and/or erase cycles over a number of memory blocks so that write cycles or erase cycles do not concentrate on a relatively few memory blocks. By monitoring and effectively distributing write cycles and/or erase cycles over all of the available memory blocks, the effective life time of the memory device 100 may be extended.

Figure 17:
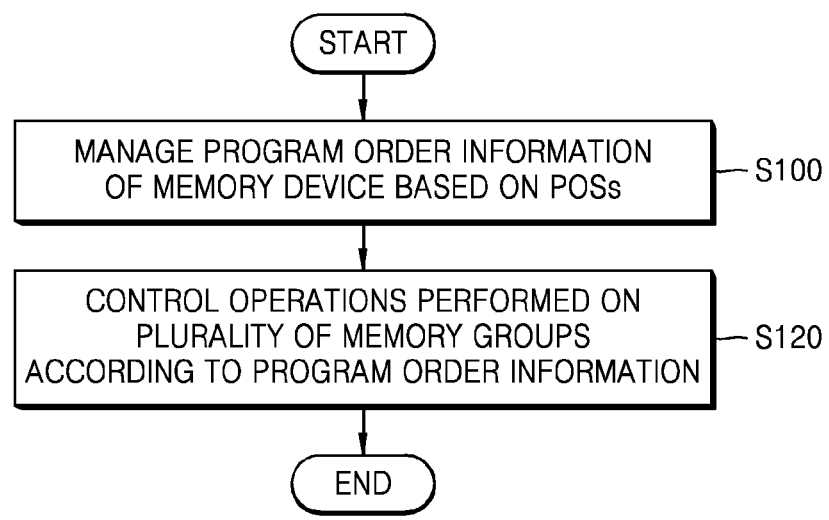
FIG. 17 is a flowchart summarizing a method of operating the memory system, according to certain embodiments of the inventive concept.

FIG. 17 is a flowchart summarizing a method of operating the memory system 10 according to certain embodiments of the inventive concept.

Referring to FIG. 17, the exemplary method controls the execution of various memory system operations in relation to a plurality of memory groups included in the memory device 100 and in view of a programming order for the plurality of memory groups.

In the exemplary method, program order information is managed according to POSs that track the programming order of memory groups of the memory device 100 (S100). Each POS indicates a relative temporal relationship for an operation (e.g., a program operation or an erase operation) performed in relation to at least one of the plurality of memory groups, where memory groups may be designated according to memory block units or word line units, for example.

Then, various memory system operations (e.g., read operations) performed in relation to at least one of the plurality of memory groups may be effectively controlled in response to the program order information (S120). For example, a read voltage used during a read operation may be intelligently selected from a range of read voltages in response to program order information for a particular memory group. Reclaim operations, garbage collection operations, and/or wear leveling operations may be similarly controlled in view of relevant program order information with respect to one or more memory group.

Figure 18:
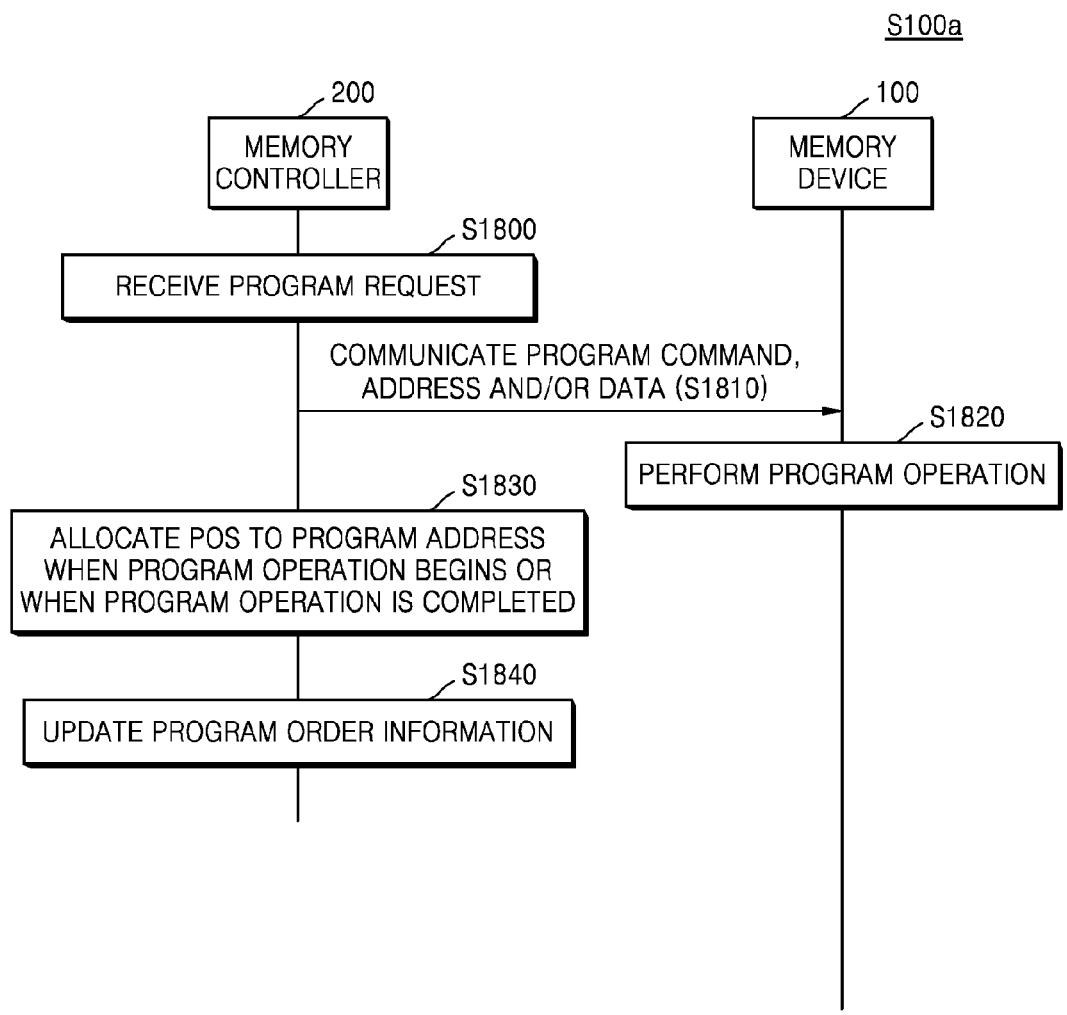
FIG. 18 is an operating diagram further illustrating in one example of the step of managing program information described in the method of FIG. 17 according to certain embodiments of the inventive concept.

FIG. 18 is an operating diagram further illustrating in one example (100*a*) of the step (S100) of managing program information described in the method of FIG. 17 according to certain embodiments of the inventive concept.

Referring to FIG. 18, the various sub-steps may be executed by the memory controller 200 and/or memory device 100 of FIG. 1.

In the exemplary method step, the memory controller 200 receives a program request from a host (S1800), and then the memory controller 200 communicates (or transmits) corresponding command(s), address(es) and/or data to the memory device 100 (S1810).

The memory device 100 then performs the requested program operation in response to the command and address (S1820). Thus, the memory device 100 may perform the program operation by providing write data received in connection with the program command to one or more memory cells identified in the memory cell array by the program address. In certain embodiments of the inventive concept, the memory device 100 will be configured to perform program operations according to page units.

Then, either when the program operation begins or after it is completed, the memory controller 200 will allocate a POS to the program address (S1830), and the memory controller 200 updates the program order information (S1840). Thus, the memory controller 200 may update the program order information by storing the newly allocated POS and an address corresponding to the POS.

Figure 19:
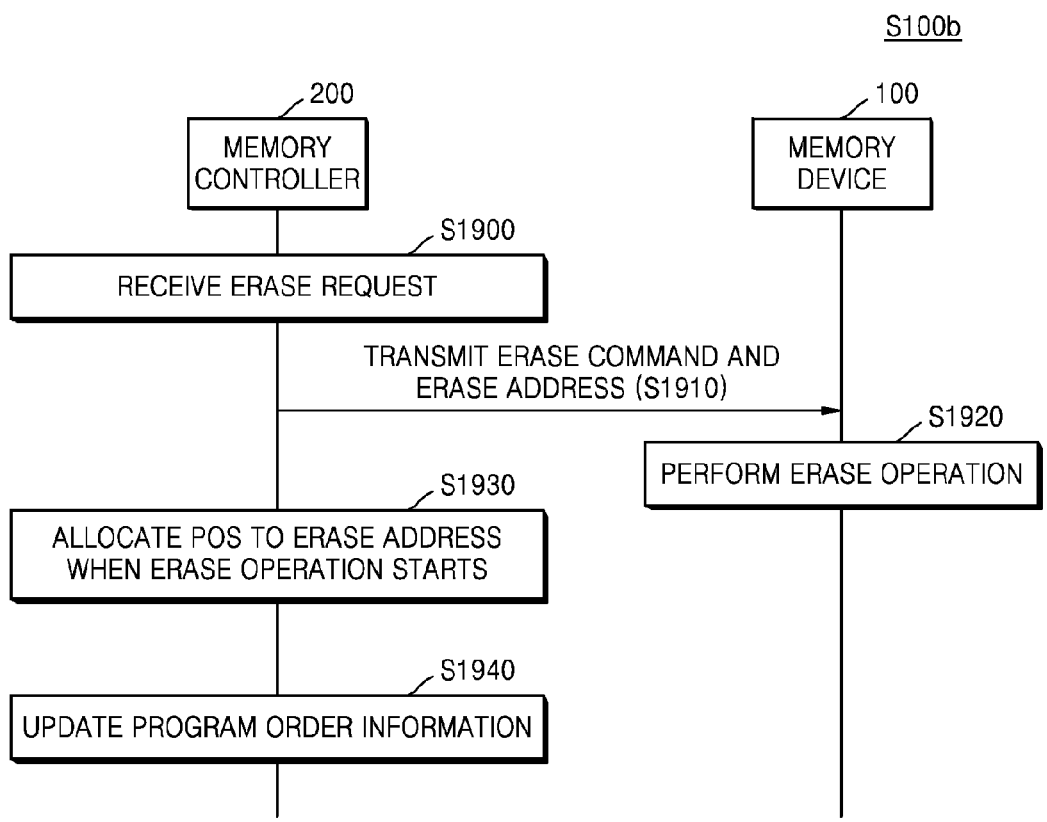
FIG. 19 is an operating diagram further illustrating in another example of the step of managing program information described in the method of FIG. 17 according to certain embodiments of the inventive concept.

FIG. 19 is an operating diagram further illustrating in another example (100*b*) of the step (S100) of managing program information described in the method of FIG. 17 according to certain embodiments of the inventive concept.

In the exemplary method step, the memory controller 200 receives an erase request from a host (S1900), and the memory controller 200 will communicate an erase command and an erase address to the memory device 100 (S1910). Then, the memory device 100 will performs the requested erase operation using the erase address (S1920). In certain embodiments of the inventive concept, the memory device 100 will perform erase operations according to memory block units.

The memory controller 200 then allocates a POS to the erase address when the erase operation is performed (S1930), and the memory controller 200 updates the program order information (S1940). That is, the memory controller 200 may update the program order information by storing the newly allocated POS and an address corresponding to the POS.

Figure 20:
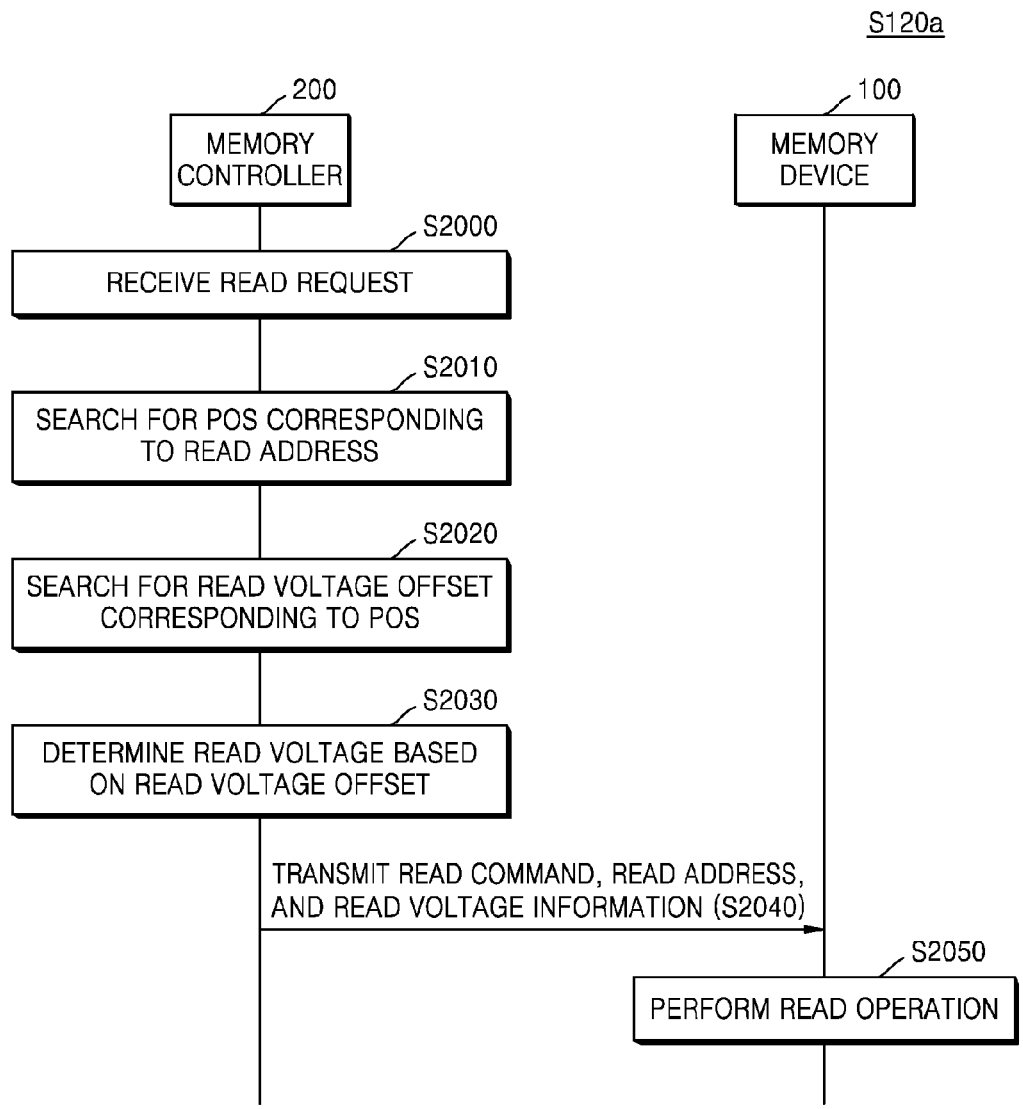
FIG. 20 is an operating diagram further illustrating in one example of the step of controlling memory system operations according to the program order information described in the method of FIG. 17 according to certain embodiments of the inventive concept.

FIG. 20 is an operating diagram further illustrating in one example (120*a*) of the step (S120) of controlling memory system operations according to the program order information described in the method of FIG. 17 according to certain embodiments of the inventive concept.

Here again, the method step may be performed using the memory controller 200 and/or memory device 100 of FIG. 1, and in certain embodiments of the inventive concept, the read voltage controller 221 of FIG. 9.

The method step begins when the memory controller 200 receives a read request including a read address from a host (S2000), and the memory controller 200 searches for a POS corresponding to the read address (S2010). Once the POS is identified, the memory controller 200 searches for a read voltage offset corresponding to the identified POS (S2020), and determines a read voltage based on the read voltage offset (S2030).

The memory controller 200 then communicates a read command, the read address, and read voltage information to the memory device 100 (S2040). Here, the read voltage information may information defining the read voltage determined by the read voltage controller 221. Then, the memory device 100 performs the requested read operation using the read address and the read voltage (S2050). That is, the memory device 100 may perform a read operation to retrieve read data stored in one or more memory cells of the memory device corresponding to the read address.

Figure 21:
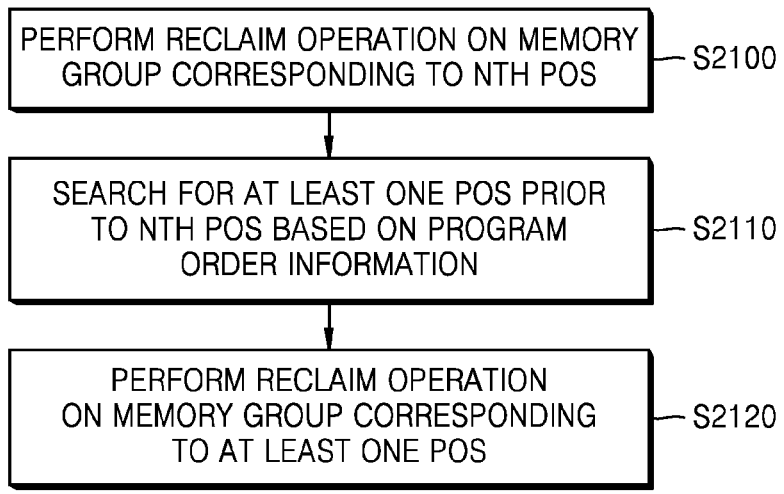
FIG. 21 is an operating diagram further illustrating in another example of the step (S120) of controlling memory system operations according to the program order information described in the method of FIG. 17.

FIG. 21 is an operating diagram further illustrating in another example (120b) of the step (S120) of controlling memory system operations according to the program order information described in the method of FIG. 17 according to certain embodiments of the inventive concept. This method step may be performed in certain embodiments of the inventive concept using the reclaim controller 222 of FIG. 16.

In the exemplary method step, the reclaim operation is performed in relation to a memory group corresponding to an nth POS (S2100). Thus, at least one POS prior to the nth POS is sought based on the program order information (S2110), where the value of the at least one POS is less than a value of the nth POS. In other words, a memory group corresponding to the at least one POS may be programmed earlier than a memory group corresponding to the nth POS. Then, the reclaim operation is performed on the memory group corresponding to the at least one POS (S2120).

Figure 22:
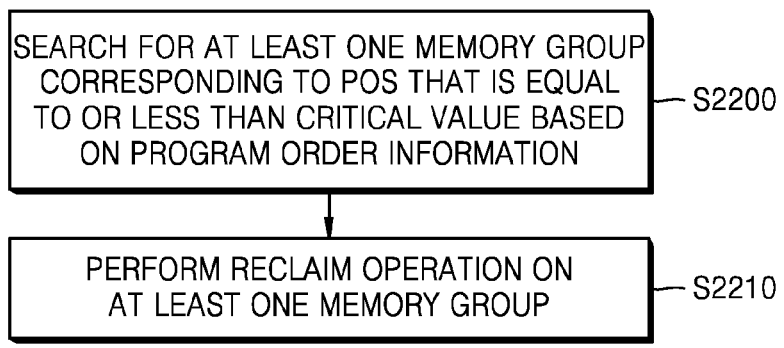
FIG. 22 is an operating diagram further illustrating still another example of the step of controlling memory system operations according to the program order information described in the method of FIG. 17 according to certain embodiments of the inventive concept.

FIG. 22 is an operating diagram further illustrating still another example (120c) of the step (S120) of controlling memory system operations according to the program order information described in the method of FIG. 17 according to certain embodiments of the inventive concept. This method step may be performed in certain embodiments of the inventive concept using the reclaim controller 222 of FIG. 16.

At least one memory group corresponding to a POS that is equal to or less than a critical value is searched for based on the program order information (S2200). The critical value may be a value sufficiently low to indicate a memory group wherein successive program operations are temporally separated by a significant period. The reclaim operation is then performed on the at least one memory group (S2210), where the reclaim operation may be collectively performed based on the program order information such that the time required to perform the reclaim operation is notably reduced.

Figure 23:
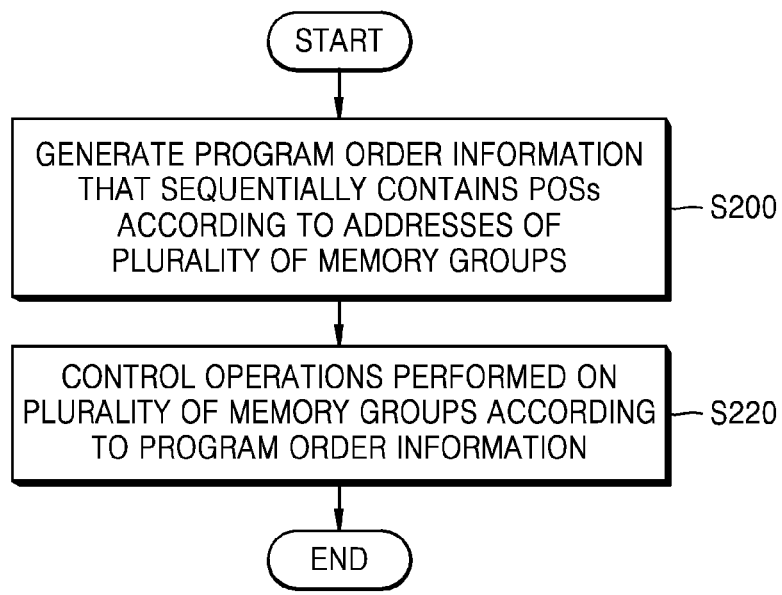
FIG. 23 is a flowchart summarizing a method of operating the memory system of FIG. 1 according to certain embodiments of the inventive concept.

FIG. 23 is a flowchart summarizing a method of operating the memory system 10 of FIG. 1 according to certain embodiments of the inventive concept.

Referring to FIG. 23, the method controls various memory system operations performed in relation to a plurality of memory groups included in a memory device according to a programming order of the plurality of memory groups.

Thus, program order information containing sequential POSs is generated according to addresses of a plurality of memory groups (S200). That is, the program order manager 210 may sequentially store the POSs according to the addresses of the plurality of memory groups such that the POSs may be searched for according to the addresses of the plurality of memory groups.

Thereafter, operations performed in relation to the plurality of memory groups will be controlled according to the program order information (S220). Here, the operation controller 220 may differently control various memory system operations directed to at least one of the memory groups whose POS has a relatively high value and a memory group whose POS has a relatively low value. In this manner, the operation controller 220 may predict data retention conditions for the plurality of memory groups based on the program order information, and may differently control operations performed on a memory group having a relatively long retention time and a memory group having a relatively short retention time.

Figure 24:
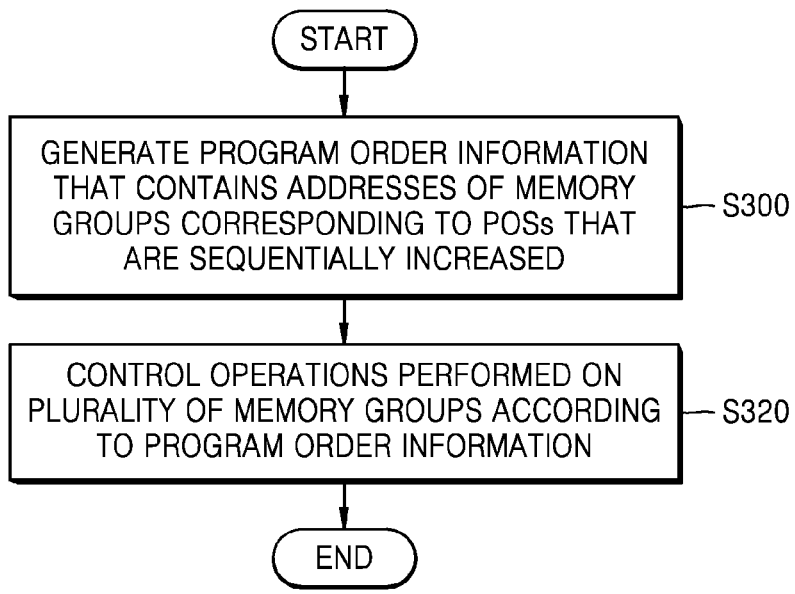
FIG. 24 is a flowchart summarizing a method of operating the memory system of FIG. 1 according to embodiments of the inventive concept.

FIG. 24 is a flowchart summarizing a method of operating the memory system 10 of FIG. 1 according to embodiments of the inventive concept.

Referring to FIG. 24, the method controlling operations performed on a plurality of memory groups included in the memory device 100 according to a program order of the plurality of memory groups.

In the exemplary method, the program order information that contains addresses of memory groups corresponding to POSs that are sequentially increased is generated (S300). The program order manager 210 may store the addresses of the memory groups according to the POSs that are sequentially increased so that the addresses of the plurality of memory groups are searched for according to the POSs. In detail, the program order information may be generated by using at least one selected from the group consisting of a table, a linked list, a doubly-linked list, a circular buffer, and a FIFO buffer.

Operations performed on the plurality of memory groups are controlled according to the program order information (S320). In detail, the operation controller 220 may differently control operations performed on a memory group whose POS has a relatively high value and a memory group whose POS has a relatively low value. In detail, the operation controller 220 may predict data retention conditions of the plurality of memory groups based on the program order information, and may differently control operations performed on a memory group having a relatively long data retention time and a memory group having a relatively short data retention time.

Figure 25:
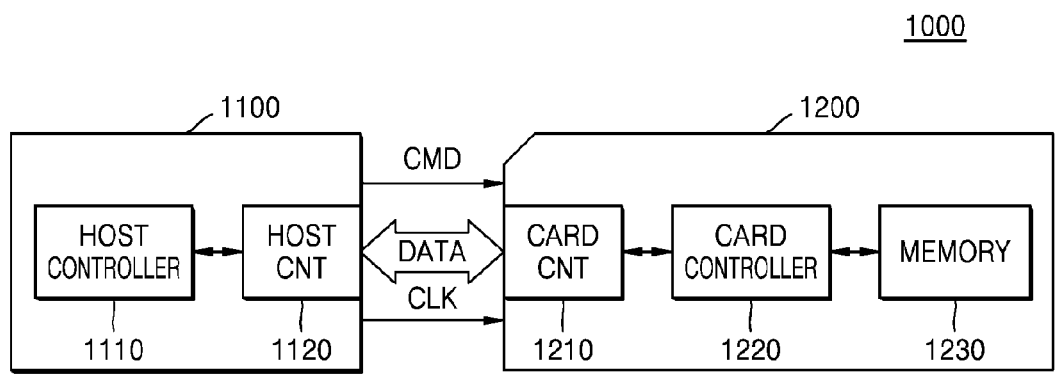
FIG. 25 is a block diagram illustrating a memory card system to which a memory system is applied.

FIG. 25 is a block diagram illustrating a memory card system 1000 to which a memory system is applied.

Referring to FIG. 25, the memory card system 1000 may include a host 1100 and a memory card 1200. The host 1100 may include a host controller 1110 and a host connector 1120. The memory card 1200 may include a card connector 1210, a card controller 1220, and a memory device 1230. In this case, the memory card 1200 may be formed by using the exemplary embodiments of FIGS. 1 through 24.

The host 1100 may write data to the memory card 1200 or may read data that is stored in the memory card 1200. The host controller 1110 may transmit a command CMD, a clock signal CLK that is generated by a clock generator (not shown) in the host 1100, and data DATA to the memory card 1200 through the host connector 1120.

The card controller 1220 may store the data DATA in the memory device 1230 in synchronization with a clock signal CLK that is generated by a clock generator (not shown) in the card controller 1220, in response to the command CMD received through the card connector 1210. The memory device 1230 may store the data DATA that is transmitted from the host 1100.

The memory card 1200 may be a compact flash card (CFC), a microdrive, a smart media card (SMC), a multimedia card (MMC), a security digital card (SDC), a memory stick, or a USB flash memory driver.

Figure 26:
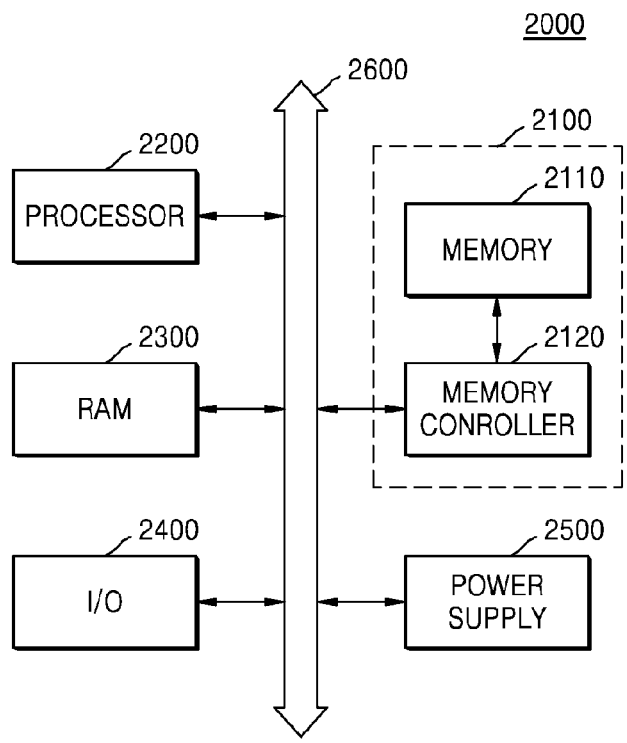
FIG. 26 is a block diagram illustrating a computing system including a memory system operated in accordance with an embodiment of the inventive concept.

FIG. 26 is a block diagram illustrating a computing system 2000 including a memory system 2100 operated in accordance with an embodiment of the inventive concept.

Referring to FIG. 26, the computing system 2000 may include the memory system 2100, a processor 2200, a RAM 2300, an input/output device 2400, and a power supply 2500. Although not shown in FIG. 26, the computing system 2000 may further include ports that may communicate with a video card, a sound card, a memory card, a USB device, or other electronic devices. The computing system 2000 may be a personal computer, or a portable electronic device such as a laptop computer, a mobile phone, a personal digital assistant (PDA), or a camera.

The processor 2200 may perform specific calculations and tasks. According to exemplary embodiments, the processor 2200 may be a microprocessor or a CPU. The processor 220 may communicate with the RAM 2300, the input/output device 2400, and the memory system 2100 via a bus 2600 such as an address bus, a control bus, or a data bus. In this case, the memory system 2100 may be formed by using the exemplary embodiments of FIGS. 1 through 25.

According to exemplary embodiments, the processor 2200 may be connected to an expansion bus such as a PCI bus.

The RAM 2300 may store data that is necessary to operate the computing system 2000. For example, the RAM 2300 may be a DRAM, a mobile DRAM, an SRAM, a PRAM, a ferroelectric RAM (FRAM), an RRAM, and/or an MRAM.

The input/output device 2400 may include an input unit such as a keyboard, a keypad, and/or a mouse and an output unit such as a printer and/or a display. The power supply 2500 may supply an operating voltage that is necessary to operate the computing system 2000.

Figure 27:
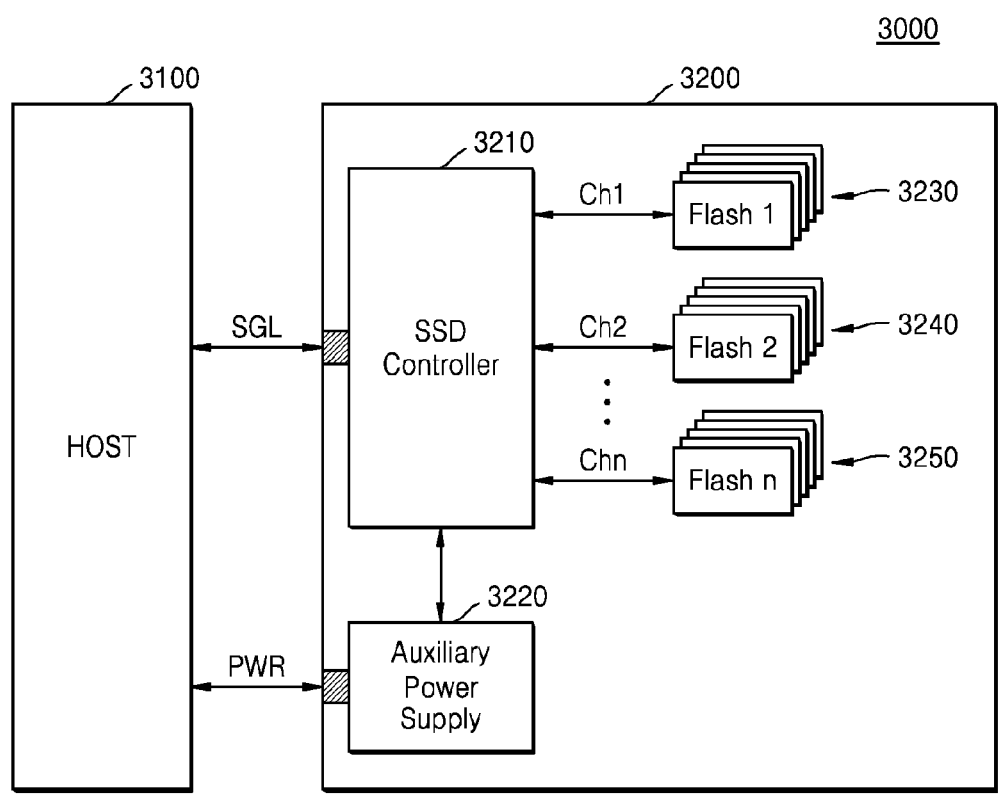
FIG. 27 is a block diagram illustrating a solid-state drive (SSD) system to which a memory system according to an embodiment of the inventive concept may be applied.

FIG. 27 is a block diagram illustrating a solid-state drive (SSD) system 3000 to which a memory system according to an embodiment of the inventive concept may be applied.

Referring to FIG. 27, the SSD system 3000 may include a host 3100 and an SSD 3200. The SSD 3200 transmits and receives a signal to and from the host 3100 through a signal connector, and receives power through a power connector. The SSD 3200 may include an SSD controller 3210, an auxiliary power device 3220, and a plurality of memory devices 3230, 3240, and 3250. In this case, the SSD 3200 may be formed by using the exemplary embodiments of FIGS. 1 through 26.

According to the inventive concept, since a programming order of a plurality of memory groups included in a memory device is managed using POSs and operations performed on the plurality of memory groups are controlled according to the program order, the operations may be performed adaptively to retention characteristics of the memory device, thereby improving the performance and reliability of the memory device.

While the inventive concept has been particularly shown and described with reference to exemplary embodiments thereof, it will be understood that various changes in form and details may be made therein without departing from the scope of the following claims.

What is claimed is:

1. A method of operating a memory system comprising a memory device, the method comprising:
managing program order information of the memory device based on program order stamps (POSs) indicating relative temporal relationships between program operations performed in relation to a plurality of memory groups included in the memory device; and
controlling operations directed to the plurality of memory groups in response to the program order information,
wherein the controlling of operations comprises at least one of:
controlling selection of a read voltage for each one of the plurality of memory groups based on the program order information,
controlling a reclaim operation performed on at least one of the plurality of memory groups based on the program order information;
controlling a garbage collection operation performed on the memory device based on the program order information; and
controlling a wear leveling operation performed on the memory device based on the program order information.

2. The method of claim 1, wherein the POSs indicate an order at least one of erase operations and program operations performed in relation to the plurality of memory groups.

3. The method of claim 1, wherein the managing of the program order information comprises sequentially storing the POSs according to addresses of the plurality of memory groups, such that the POSs are searchable according to the addresses of the plurality of memory groups.

4. The method of claim 1, wherein the managing of the program order information comprises storing addresses of the plurality of memory groups corresponding to sequentially increasing POSs, such that the addresses of the memory groups are searchable according to the POSs.

5. The method of claim 1, wherein the managing of the program order information comprises storing the program order information using at least one of a table, a linked list, a doubly-linked list, a circular buffer, and a first-in first-out (FIFO) buffer.

6. The method of claim 1, wherein the plurality of memory groups is designated in the memory device in accordance with memory block units.

7. The method of claim 6, wherein the managing of the program order information comprises at least one of:
allocating a POS to a memory block and updating the program order information when a program operation directed to the memory block begins,
allocating a POS to a memory block and updating the program order information when a program operation directed to the memory block is completed, and
allocating a POS to a memory block and updating the program order information when an erase operation is performed on the memory block.

8. The method of claim 1, wherein the plurality of memory groups is designated in the memory device in accordance with word line units.

9. The method of claim 8, wherein the managing of the program order information comprises at least one of:
allocating a POS to a first word line and updating the program order information when a first-executed program operation directed to the first word line is executed, and
allocating a POS to a first word line and updating the program order information when a last-executed program operation directed to the first word line is executed.

10. The method of claim 1, wherein the memory device comprises a single-level memory cell (SLC) block and a multi-level memory cell (MLC) block, and
managing of the program order information comprises managing the program order information for only the MLC block.

11. The method of claim 1, wherein the memory device comprises a multi-level memory cell (MLC) block, and
managing the program order information comprises respectively managing first program order information for the MLC block and managing second program order information for the MLC block.

12. The method of claim 1, wherein at least two of the plurality of memory groups share a same POS.

13. The method of claim 1, further comprising:
   storing the program order information in the memory device.

14. The method of claim 13, wherein the program order information comprises a flag and a POS of each one of the plurality of memory groups, the flag indicating whether the memory group is used in order to update a mapping table stores a read voltage offset and a POS corresponding to the read voltage offset.

15. The method of claim 1, wherein the controlling of the selection of a read voltage comprises:
   searching for a POS corresponding to a first memory group among the plurality of memory groups based on the program order information;
   searching for a read voltage offset corresponding to the POS corresponding to the first memory group; and
   performing a read operation directed to the first memory group using the read voltage offset.

16. The method of claim 1, wherein the controlling of the reclaim operation comprises at least one of:
   performing the reclaim operation directed to a first memory group among the plurality of memory groups having an allocated POS, and
   performing the reclaim operation on at least one memory group having to a POS less than or equal to a critical value.

17. A method of operating a memory system comprising a memory device, the method comprising:
   based on program order stamps (POSs) indicating relative temporal relationship between program operations performed on a plurality of memory groups that are included in the memory device, generating program order information that sequentially contains the POSs according to addresses of the plurality of memory groups; and
   controlling operations performed on the plurality of memory groups based on the program order information,
   wherein the controlling of operations directed to the plurality of memory groups in response to the program order information comprises at least one of:
   controlling selection of a read voltage for each one of the plurality of memory groups based on the program order information,
   controlling a reclaim operation performed on at least one of the plurality of memory groups based on the program order information;
   controlling a garbage collection operation performed on the memory device based on the program order information; and
   controlling a wear leveling operation performed on the memory device based on the program order information.

18. A method of operating a memory system comprising a memory device, the method comprising:
   based on program order stamps (POSs) indicating relative temporal relationships between program operations performed on a plurality of memory groups that are included in the memory device, generating program order information that contains addresses of memory groups corresponding to POSs that are sequentially increased according to the POSs that are sequentially increased; and
   controlling operations performed on the plurality of memory groups based on the program order information,
   wherein the controlling of operations directed to the plurality of memory groups in response to the program order information comprises at least one of:
   controlling selection of a read voltage for each one of the plurality of memory groups based on the program order information,
   controlling a reclaim operation performed on at least one of the plurality of memory groups based on the program order information;
   controlling a garbage collection operation performed on the memory device based on the program order information; and
   controlling a wear leveling operation performed on the memory device based on the program order information.

19. The method of claim 18, wherein the generating of the program order information comprises generating the program order information by using at least one selected from the group consisting of a table, a linked list, a doubly-linked list, a circular buffer, and a first-in first-out (FIFO) buffer.

* * * * *